(12) United States Patent
Hashimoto et al.

(10) Patent No.: US 12,285,724 B2
(45) Date of Patent: Apr. 29, 2025

(54) MEMBRANE DISTILLATION MODULE AND MEMBRANE DISTILLATION APPARATUS USING SAME

(71) Applicant: Asahi Kasei Kabushiki Kaisha, Tokyo (JP)

(72) Inventors: Tomotaka Hashimoto, Tokyo (JP); Tomoya Anan, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 461 days.

(21) Appl. No.: 17/420,425

(22) PCT Filed: Jan. 10, 2020

(86) PCT No.: PCT/JP2020/000744
§ 371 (c)(1),
(2) Date: Jul. 2, 2021

(87) PCT Pub. No.: WO2020/145401
PCT Pub. Date: Jul. 16, 2020

(65) Prior Publication Data
US 2022/0080358 A1   Mar. 17, 2022

(30) Foreign Application Priority Data
Jan. 11, 2019   (JP) .................................. 2019-003380

(51) Int. Cl.
*B01D 61/36*   (2006.01)
*B01D 69/02*   (2006.01)
(Continued)

(52) U.S. Cl.
CPC ....... *B01D 61/364* (2013.01); *B01D 61/3641* (2022.08); *B01D 69/02* (2013.01);
(Continued)

(58) Field of Classification Search
CPC ...... B01D 61/364; B01D 63/02; B01D 69/02; B01D 69/08; B01D 2313/04;
(Continued)

(56) References Cited

U.S. PATENT DOCUMENTS 4,966,699 A    10/1990  Sasaki et al.
2003/0111416 A1  6/2003  Kubota et al.
(Continued)

FOREIGN PATENT DOCUMENTS

CN    101659451 A    3/2010
CN    102107120 A    6/2011
(Continued)

OTHER PUBLICATIONS

International Search Report issued in corresponding International Patent Application No. PCT/JP2020/000744 dated Mar. 10, 2020.
(Continued)

*Primary Examiner* — Waqaas Ali
(74) *Attorney, Agent, or Firm* — Morgan, Lewis & Bockius LLP

(57) ABSTRACT

The purpose of the present invention is to provide: a membrane distillation module with excellent stability of water treatment ability over time as a result of wetting being controlled; and a membrane distillation apparatus comprising the same. Provided is a membrane distillation module that comprises a housing and multiple porous hollow fiber membranes, both ends of which are bonded and fixed to the housing, wherein: the water contact angle of the outer surfaces of the porous hollow fiber membranes is at least 90°; and a hydrophobic polymer adheres to at least some of the areas of the porous hollow fiber membranes that are not bonded and fixed.

12 Claims, 9 Drawing Sheets

(51) Int. Cl.
*B01D 69/08* (2006.01)
*C02F 1/44* (2023.01)

(52) U.S. Cl.
CPC .............. *B01D 69/08* (2013.01); *C02F 1/447* (2013.01); *B01D 2313/042* (2022.08); *B01D 2313/22* (2013.01); *B01D 2325/38* (2013.01); *C02F 2201/004* (2013.01)

(58) Field of Classification Search
CPC ............ B01D 2313/22; B01D 2325/38; B01D 2323/04; B01D 61/366; B01D 63/021; B01D 67/0088; C02F 1/447; C02F 2201/004; Y02A 20/131
See application file for complete search history.

(56) References Cited

U.S. PATENT DOCUMENTS

| | | |
|---|---|---|
| 2009/0139925 A1 | 6/2009 | Sternberg |
| 2011/0165308 A1 | 7/2011 | Shiki |
| 2016/0038879 A1 | 2/2016 | Yamaguchi et al. |
| 2017/0072371 A1 | 3/2017 | Hayashi et al. |
| 2017/0173536 A1 | 6/2017 | Nagata et al. |
| 2020/0109070 A1 | 4/2020 | Hashimoto et al. |

FOREIGN PATENT DOCUMENTS

| | | | |
|---|---|---|---|
| CN | 102164656 A | | 8/2011 |
| CN | 106413866 A | | 2/2017 |
| EP | 2239043 A1 | | 10/2010 |
| EP | 3085400 A1 | | 10/2016 |
| EP | 3184163 A1 | | 6/2017 |
| JP | H01-259870 A | | 10/1989 |
| JP | H03-038231 A | | 2/1991 |
| JP | H06-226066 A | | 8/1994 |
| JP | 2002-11331 A | | 1/2002 |
| JP | 2007-061671 A | | 3/2007 |
| JP | 2011-000509 A | | 1/2011 |
| JP | 2018-083189 A | | 5/2018 |
| KR | 20170125482 A | * | 11/2017 |
| WO | 01/53213 A1 | | 7/2001 |
| WO | 2015/080125 A1 | | 6/2015 |
| WO | 2016/006670 A1 | | 1/2016 |
| WO | WO-2018174279 A1 | * | 9/2018 ........... B01D 61/364 |

OTHER PUBLICATIONS

International Preliminary Report on Patentability and Written Opinion issued in corresponding International Patent Application No. PCT/JP2020/000744 dated Jul. 22, 2021.

Supplementary European Search Report issued in corresponding European Patent Application No. 20738132.8 dated Feb. 2, 2022.

* cited by examiner

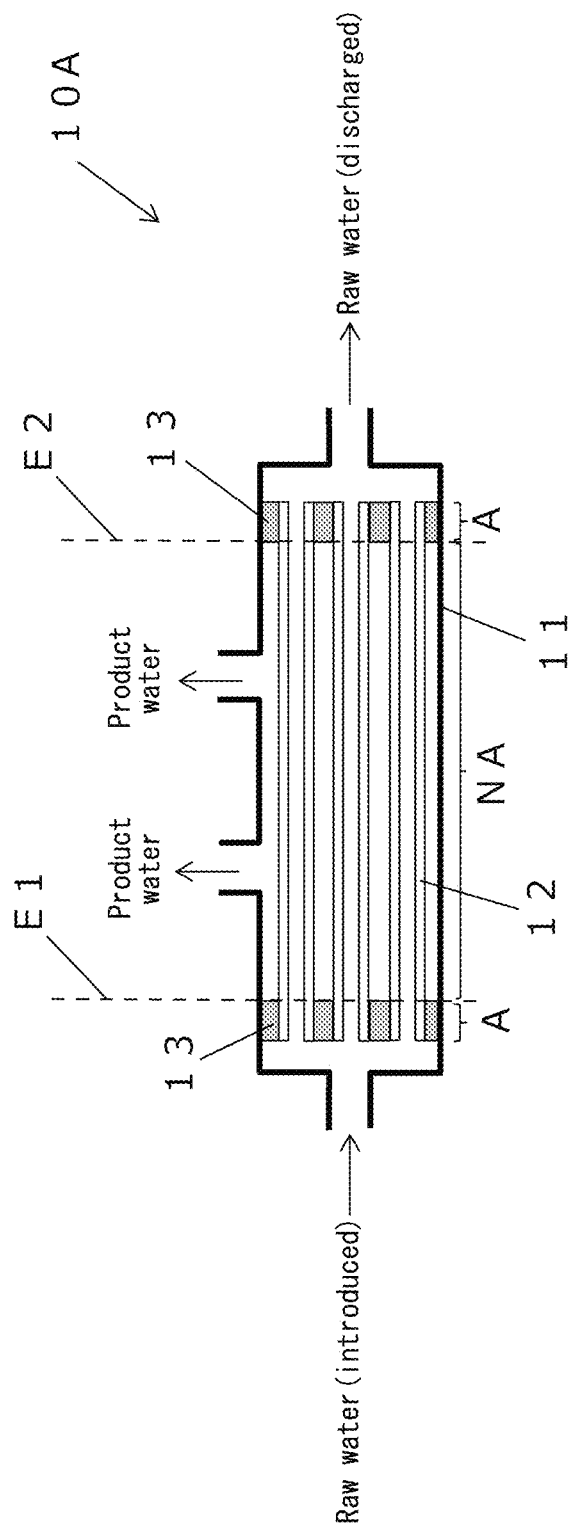

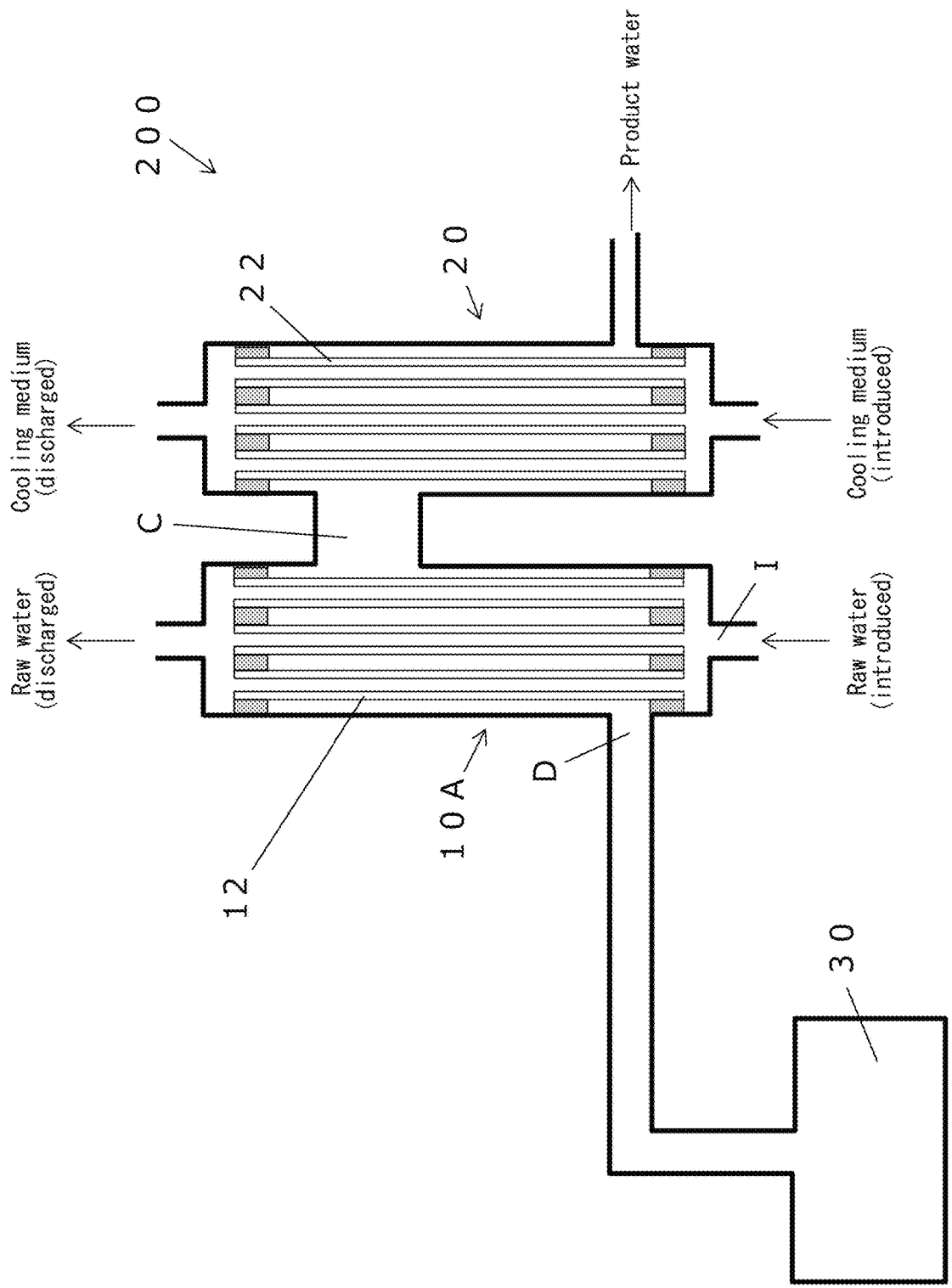

MEMBRANE DISTILLATION MODULE AND MEMBRANE DISTILLATION APPARATUS USING SAME

FIELD

The present invention relates to a module for membrane distillation and to a membrane distillation device equipped with it.

BACKGROUND

Membrane distillation methods are methods that use a porous membrane which allows only water vapor to pass through from water to be treated, and that concentrate the water vapor that has passed through the porous membrane from heated raw water (high-temperature water) based on differences in saturated water vapor pressure, to obtain distilled water. Membrane distillation methods do not require high driving force, unlike reverse osmosis methods in which purified water is obtained by filtering raw water through a reverse osmosis membrane with application of pressure to obtain purified water, and they therefore allow reduction in power energy consumption. In addition, membrane distillation methods allow high-purity water to be obtained because of their extremely high separation performance for non-volatile solutes such as salts.

In a conventional membrane distillation method, only the vapor passes through the dry membrane without infiltration of liquids into the membrane interior, and therefore high-purity purified water is obtained. With prolonged use, however, or when raw water with low surface tension has been used, "wetting" occurs, which is passage of raw water from the surface of the membrane in contact with the raw water (raw water entering surface) to the other surface where vapor exits (vapor exiting surface). Raw water therefore mixes with the distilled water, causing problems of reduced membrane permeation performance and reduced maintenance of water throughput capacity. Wetting is affected by the pore diameter of the porous membrane used for membrane distillation, the hydrophobicity of the membrane, and the surface tension of the water to be treated. It is known that the pore diameter and surface opening ratio of the porous membrane contribute to membrane permeability, vapor permeation performance and membrane distillation device compactness (PTLs 1 and 2).

For water permeability retention and membrane surface scratch resistance, PTL 1 discloses a porous hollow fiber membrane having an outer surface opening ratio of at least 20% and less than 50%, and being formed of a polyolefin, olefin-olefin halide copolymer, polyolefin halide or the like.

PTL 2 describes a hydrophobic porous hollow fiber membrane having a surface opening ratio of 20% to 70% on the membrane surface that contacts with water to be treated, as a membrane to be used in a membrane distillation device with water throughput capacity and compactness, and an average pore diameter of no larger than 10 μm is used from the viewpoint of inhibiting wetting.

Modification of the surface of a porous membrane to inhibit wetting during membrane distillation is also known (PTL 3). PTL 3 describes treating the surface of a porous membrane with a fluorinated monomer or other polymer to impart liquid repellency, in order to inhibit the tendency of the surface of the porous membrane made of polytetrafluoroethylene (PTFE), polyvinylidene fluoride (PVDF) or the like to become covered and wetted with oils.

CITATION LIST

Patent Literature

[PTL 1] International Patent Publication No. 2001/053213
[PTL 2] International Patent Publication No. 2016/006670
[PTL 3] International Patent Publication No. 2015/080125

SUMMARY

Technical Problem

As mentioned above, it has been attempted to inhibit wetting in membrane distillation by controlling the surface opening ratio of the membrane and modifying the hydrophobic polymers on the membrane surface. In terms of the structure of the module for membrane distillation, however, these improvements alone have been inadequate for inhibiting wetting. Particularly for membrane modules, where both ends of a hollow fiber membrane are usually anchored in a housing with an adhesive resin, the present inventors have found that wetting tends to occur near the borders between adhesively anchored locations and non-adhesively anchored locations.

Two main reasons are attributed to the tendency to wetting near the borders between adhesively anchored locations and non-adhesively anchored locations. The first reason is that even if the porous membrane is treated against wetting, wetting origins still form during the post-processing membrane module production. Specifically, during the process of fabricating a membrane module with the porous membrane adhesively anchored to the housing with an adhesive resin, the adhesive resin permeates the porous membrane before curing, resulting in the adhesive resin covering the pore surfaces on the surface and in the interior of the membrane near the borders between adhesively anchored locations and non-adhesively anchored locations, after curing. Since resins used for adhesive anchoring are resins with low hydrophobicity such as epoxy resins and urethane resins, even if the porous membrane itself has the ability to prevent wetting, the properties of the membrane approach those of the adhesive resin in the areas surrounding the adhesive resin, thus resulting in wetting.

The second reason is that vapor is not generated in uniform amounts at all of the locations of the membrane during operation of the module for membrane distillation, and wetting occurs at the locations with active evaporation. In a construction in which raw water flows into a porous hollow fiber membrane, heat of vaporization is consumed when the raw water is sent out through the membrane as vapor, and therefore the raw water temperature is highest at the locations where the raw water enters and lower as the raw water propagates in the lengthwise direction of the membrane. If the temperature of the raw water entering the module is 90° C., for example, the temperature of the raw water discharged from the module may be 70° C. In such cases, the amount of vapor generated at the raw water inlet section is greater, and wetting tends to occur at that location. In the other case of a structure in which raw water flows to the outside of the porous hollow fiber membrane, for example, vapor leaves the module via the inside of the hollow fiber membrane, and therefore vapor is actively generated at the sections of the porous hollow fiber membrane near the locations of delivery out of the module, with wetting tending to occur at those locations.

According to one mode of the invention, it is an object to solve this problem by providing a module for membrane distillation which has excellent prolonged stability of water throughput capacity due to inhibited wetting, as well as a membrane distillation device comprising it.

Solution to Problem

As a result of much avid research with the intention of solving the two main problems causing wetting, the present inventors have found that if a hydrophobic polymer is adhered near the adhesively anchored locations which are anchored with an adhesive resin, as according to one aspect of the invention, infiltration of the adhesive resin into the hollow fiber membrane can be prevented, hydrophobicity of the hollow fiber membrane can be maintained, and evaporation at those locations can be reduced, thereby inhibiting wetting. According to another aspect, an optimal construction was found for a membrane distillation device that, even with slight wetting, does not cause impairment in the quality of product water during production of purified water.

Specifically, the present invention encompasses the following aspects.

[1] A module for membrane distillation comprising a housing, and a plurality of porous hollow fiber membranes each having both ends adhesively anchored to the housing, wherein:

the water contact angle of the outer surface of each of the porous hollow fiber membranes is 90° or greater, a hydrophobic polymer is adhered to at least some of the locations within the non-adhesively anchored locations of the porous hollow fiber membranes, and when the locations from one end to the other end in the lengthwise direction among the non-adhesively anchored locations are represented as 0% to 100% on both the inner surface and outer surface of each porous hollow fiber membrane, either or both the amount of hydrophobic polymer per membrane area adhering to locations at 0 to 5% from the one end and the amount of hydrophobic polymer per membrane area adhering to locations at 95 to 100% from the one end are greater than the amount of hydrophobic polymer per membrane area present in locations at 40 to 60% from the one end.

[2] A module for membrane distillation comprising a housing, and a plurality of porous hollow fiber membranes each having both ends adhesively anchored to the housing, wherein:

a hydrophobic polymer is adhered to at least some of the locations among the non-adhesively anchored locations of the porous hollow fiber membranes, and when the locations from one end to the other end in the lengthwise direction among the non-adhesively anchored locations are represented as 0% to 100% on both the inner surface and outer surface of each porous hollow fiber membrane, both the amount of hydrophobic polymer per membrane area adhering to locations at 0 to 5% from the one end and the amount of hydrophobic polymer per membrane area adhering to locations at 95 to 100% from the one end are greater than the amount of hydrophobic polymer per membrane area present in locations at 40 to 60% from the one end.

[3] The module for membrane distillation according to aspect 1 or 2, wherein a raw water introduction unit is disposed in such a manner that the non-adhesively anchored location of each porous hollow fiber membrane is nearest to the raw water introduction unit at a location within less than 50% from the one end, and the amount of the hydrophobic polymer per membrane area of the porous hollow fiber membrane satisfies the following relationship:

[Amount of hydrophobic polymer at locations at 0to20% from the one end]>[amount of hydrophobic polymer at locations at 95to100% from the one end]>[amount of hydrophobic polymer at locations at 40to60% from the one end].

[4] The module for membrane distillation according to any one of aspects 1 to 3, wherein at locations at 0 to 20% from the one end, the amount of hydrophobic polymer per membrane area on the raw water entering surface of the porous hollow fiber membrane is greater than the amount of hydrophobic polymer per membrane area on the vapor exiting surface of the porous hollow fiber membrane.

[5] A membrane distillation device for water production, comprising a module for membrane distillation according to any one of aspects 1 to 4.

[6] The membrane distillation device according to aspect 5, wherein:

the membrane distillation device further comprises a cooling device connected with the module for membrane distillation, the module for membrane distillation is constructed so that each of the porous hollow fiber membranes is anchored in essentially the vertical direction with the one end directed downward, and raw water is introduced into the porous hollow fiber membranes from the one end, and the lower end of the connecting member between the module for membrane distillation and the cooling device is at a position higher than ½ of the total height of the non-adhesively anchored locations of the porous hollow fiber membranes.

[7] The membrane distillation device according to aspect 5 or 6, wherein:

the module for membrane distillation is constructed so that each of the porous hollow fiber membranes is anchored in essentially the vertical direction with the one end directed downward, and raw water is introduced into the porous hollow fiber membranes from the one end, and the module for membrane distillation has a discharge port at a position in the vertical direction corresponding to a position lower than ½ of the total height of the non-adhesively anchored locations of the porous hollow fiber membranes.

Advantageous Effects of Invention

According to one aspect of the invention, a module for membrane distillation is provided which has excellent prolonged stability of water throughput capacity due to inhibited wetting, as well as a membrane distillation device comprising it.

BRIEF DESCRIPTION OF DRAWINGS

FIG. 1A is a schematic view showing a module for membrane distillation according to one aspect of the present disclosure.

FIG. 6B is a schematic view showing a membrane distillation device according to one aspect of the disclosure.

DESCRIPTION OF EMBODIMENTS

Figure 1B:
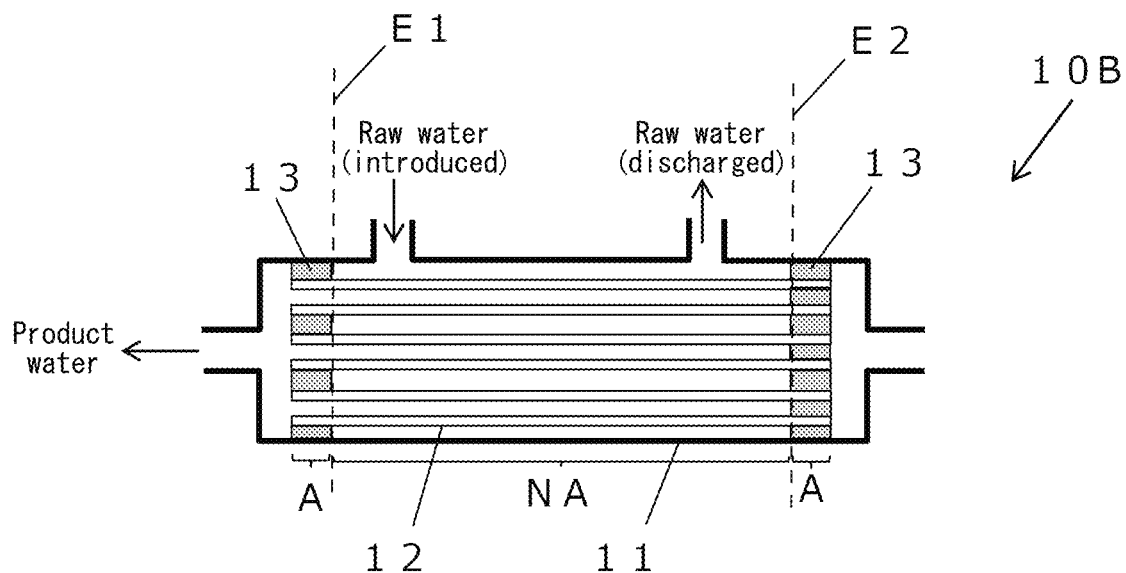
FIG. 1B is a schematic view showing a module for membrane distillation according to one aspect of the disclosure.

An embodiment for carrying out the invention (hereunder referred to as "the embodiment") will now be explained in detail. It is to be understood, incidentally, that the invention is not limited to the embodiment described below and may incorporate various modifications within the scope of the gist thereof.

One aspect of the invention provides a module for membrane distillation comprising a housing, and a plurality of porous hollow fiber membranes having both ends adhesively anchored to the housing (throughout the disclosure, these may be referred to simply as "hollow fiber membranes" or "membranes"), wherein:

a hydrophobic polymer is adhered to at least some of the locations among the non-adhesively anchored locations of the porous hollow fiber membrane, and when the locations from one end to the other end in the lengthwise direction of the non-adhesively anchored locations of the porous hollow fiber membranes are represented as 0% to 100%, either or both, and preferably both, the amount of hydrophobic polymer per membrane area adhering to locations at 0 to 5% from the one end and the amount of hydrophobic polymer per membrane area adhering to locations at 95 to 100% from the one end are greater than the amount of hydrophobic polymer per membrane area present in locations at 40 to 60% from the one end. According to one aspect, the water contact angle of the outer surface of the porous hollow fiber membrane is 90° or greater.

Throughout the disclosure, "non-adhesively anchored location" means a location of the porous hollow fiber membrane other than the adhesively anchored locations at both ends.

For the porous hollow fiber membrane of the disclosure, "inner surface" means the part of the surface of the porous hollow fiber membrane (the exposed surface of the membrane structural members) that is facing the hollow section of the membrane, "outer surface" means the part of the surface that is facing the membrane exterior (the surface opposite from the inner surface), and "pore surface" means the part of the surface other than the inner surface and outer surface (the parts of the membrane facing the pores on the inside in the thickness direction).

The amount of adhesion of a hydrophobic polymer defined for the purpose of the disclosure may be satisfied on either or both the "inner surface" and "outer surface" of the porous hollow fiber membrane, but preferably it is satisfied at least on the surface that contacts with raw water, and more preferably it is satisfied on both surfaces.

The term "membrane area" for the porous hollow fiber membrane of the disclosure means the area of the surface described above (the exposed surface of the membrane structural members).

By covering the pores of the porous hollow fiber membrane with a hydrophobic polymer it is possible to inhibit reduction in hydrophobicity of the membrane at the locations where wetting tends to occur due to infiltration of adhesive resin into the membrane, which takes place during adhesive anchoring of the porous hollow fiber membrane. While sites of wetting can also be reduced by covering a hydrophobic polymer onto the hollow fiber membrane near the adhesive resin at one end of the module, a more notable effect is obtained by covering a hydrophobic polymer onto the hollow fiber membrane near the adhesive resin at both ends of the module, and this is therefore preferred.

By adjusting the adhesion of the hydrophobic polymer in the porous hollow fiber membrane, it is possible to lower the amount of evaporation at locations of the porous hollow fiber membrane with particularly active evaporation (especially the locations where hot water is introduced), and to achieve a nearly flat vapor generation distribution throughout the entire membrane, resulting in drastically inhibited wetting. The module for membrane distillation of the embodiment therefore has excellent prolonged stability of water throughput capacity due to inhibited wetting.

[Structure of Module for Membrane Distillation]

FIG. 1A and FIG. 1B are schematic views showing module for membrane distillations according to one aspect of the disclosure. Referring to FIG. 1A and FIG. 1B, for this aspect the module for membrane distillations 10A, 10B each have a housing 11, and a plurality of porous hollow fiber membranes 12 housed in the housing 11, the porous hollow fiber membranes 12 having both ends adhesively anchored to the housing 11 by an adhesive resin 13 (the adhesively anchored locations A in FIGS. 1A and B). The locations of each of the porous hollow fiber membranes 12 other than the adhesively anchored locations A are not anchored with the adhesive resin 13 (the non-adhesively anchored locations NA in FIGS. 1A and B). In the module for membrane distillation 10A shown in FIG. 1A, raw water is introduced into the insides of the porous hollow fiber membranes 12, and the product water, which is purified water, is delivered as vapor from the outsides of the porous hollow fiber membranes 12. In the module for membrane distillation 10B shown in FIG. 1B, raw water is introduced onto the outsides of the porous hollow fiber membranes 12, and the product water (as vapor) is delivered from the insides of the porous hollow fiber membranes 12. Both of the module for membrane distillations 10A, 10B are designed so that one surface of each of the porous hollow fiber membranes 12 contacts with raw water while vapor is generated from the other surface.

In the constructions shown in FIGS. 1A and B, product water is generated as vapor by pressure reduction in the space between the sides of the hollow fiber membranes where raw water enters and the opposite sides (that is, the outsides of the hollow fiber membranes for the construction of FIG. 1A or the insides of the hollow fiber membranes for the construction of FIG. 1B). In order to isolate the raw water from the pressure-reduced section, it is necessary to provide a layer of an adhesive resin 13 that can seal the hollow fiber membranes 12 and the housing 11. Since the adhesive resin 13 must have strength that can support differential pressure between the raw water and the pressure-reduced section, the adhesive resin 13 must have a thickness that allows both ends of the membranes to be anchored at a predetermined length (a length in the lengthwise direction of the membranes). The thickness of the adhesively anchored locations A anchored with the adhesive resin 13 is determined by the temperature and pressure on the inside and outside (the raw water side and reduced pressure side) of each hollow fiber membrane, and the stress applied to the membranes.

Figure 2A:
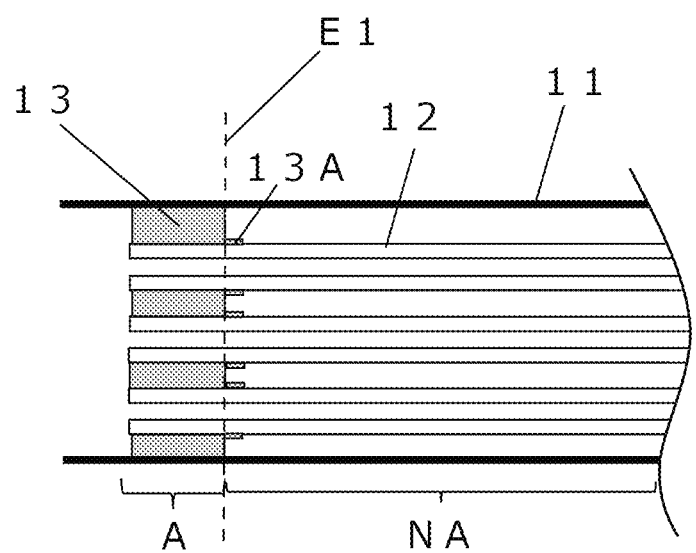
FIG. 2A is a schematic view showing the region near the borders between adhesively anchored locations A and non-adhesively anchored locations NA of porous hollow fiber membranes in which a hydrophobic polymer is not used.
Figure 2B:
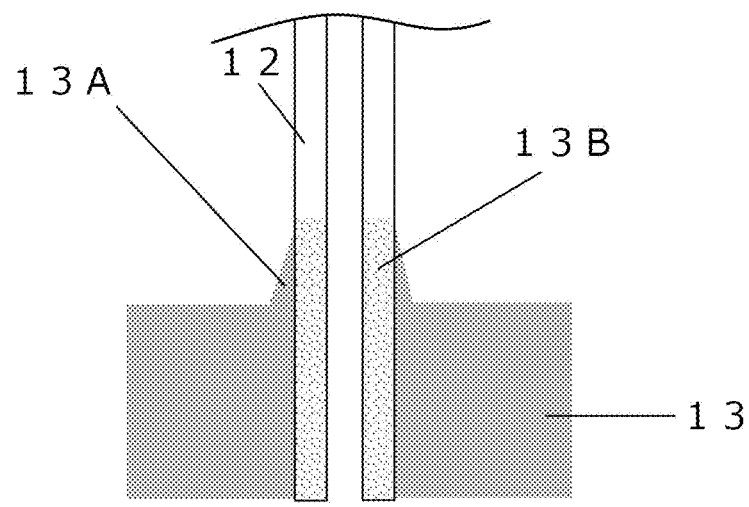
FIG. 2B is a schematic view showing the region near the border between an adhesively anchored location A and non-adhesively anchored location NA of a porous hollow fiber membrane in which a hydrophobic polymer is not used.
Figure 3A:
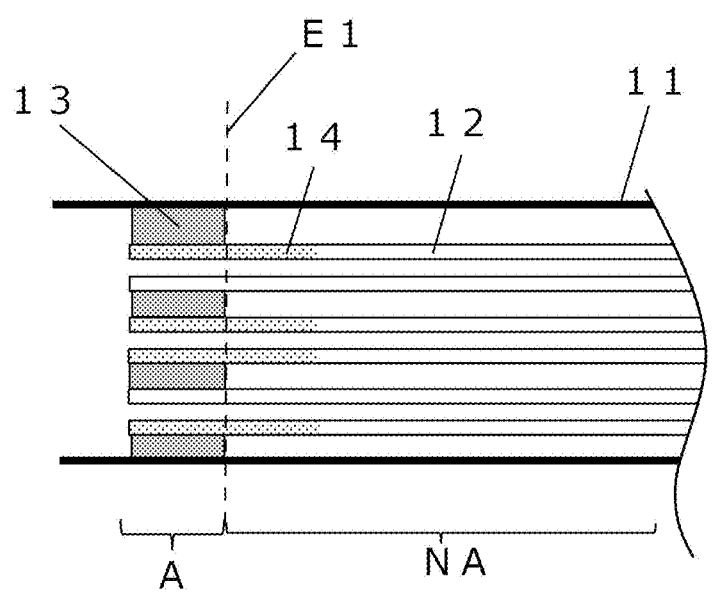
FIG. 3A is a schematic view showing the region near the borders between adhesively anchored locations A and non-adhesively anchored locations NA of porous hollow fiber membranes in which a hydrophobic polymer is used.
Figure 3B:
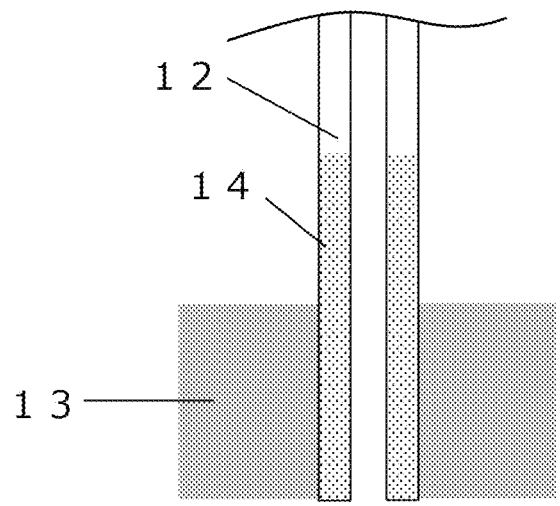
FIG. 3B is a schematic view showing the region near the border between an adhesively anchored location A and non-adhesively anchored location NA of a porous hollow fiber membrane in which a hydrophobic polymer is not used.

FIG. 2A and FIG. 2B are schematic views showing the regions near the borders between adhesively anchored locations A and non-adhesively anchored locations NA of porous hollow fiber membranes in which a hydrophobic polymer is not used, and FIG. 3A and FIG. 3B are schematic views showing the regions near the borders between adhesively anchored locations A and non-adhesively anchored locations NA of porous hollow fiber membranes in which a hydrophobic polymer is used.

Referring to FIG. 2A and FIG. 2B, when porous hollow fiber membranes 12 are adhesively anchored to the housing 11 with the adhesive resin 13, the regions near the borders between the adhesively anchored locations A and the non-adhesively anchored locations NA exhibit a phenomenon known as "rising" in which the exposed portions of the outer surfaces of the hollow fiber membranes 12 are covered by the adhesive resin (for example, the rising section 13A in FIGS. 2A and B). Rising sections form when the adhesive resin 13 contacts with the porous hollow fiber membranes 12 while in its fluid state before curing, and the adhesive resin 13 infiltrates into the pores of the porous hollow fiber membranes 12 during the time until curing. In most cases, the range of rising is within 30 mm from the border between the adhesively anchored location A and non-adhesively anchored location NA in the lengthwise direction of the membrane.

Referring to FIG. 2B, in a porous hollow fiber membrane 12 where a hydrophobic polymer is not used, a rising section 13A forms near the border between the adhesively anchored location A and the non-adhesively anchored location NA, while infiltration of adhesive resin into the pores of the hollow fiber membrane also occurs in the region spanning from the adhesively anchored location A to the non-adhesively anchored location NA for example, the infiltrating section 13B in FIG. 2B). Although membrane pores remain at the locations where infiltration has occurred, the pore surfaces exhibit the properties of the adhesive resin. Since a resin with low hydrophobicity is usually used as the adhesive resin, wetting often occurs at the rising section 13A and infiltrating section 13B.

Referring to FIG. 3A and FIG. 3B, with porous hollow fiber membranes 12 in which the hydrophobic polymer 14 is adhering at least near the borders between the adhesively anchored locations A and the non-adhesively anchored locations NA, it is possible to reduce penetration of the adhesive resin 13 into the pores of the membranes, and thus inhibit rising and infiltration, and consequently inhibit wetting as well.

Each of the constituent elements of the module for membrane distillation will now be explained.

[Porous Hollow Fiber Membranes]

The porous hollow fiber membranes used in the module for membrane distillation of the embodiment must have pores (communicating pores) running through from one surface of each membrane to the other surface in the thickness direction. The communicating pores may be network gaps in the membrane material, such as the polymer, and they may be branching or direct (i.e. non-branching) pores. The pores must allow passage of vapor while not allowing passage of raw water (liquid).

According to one aspect, the water contact angle on the outer surface of the porous hollow fiber membrane is 90° or greater, preferably 110° or greater and more preferably 120° or greater over essentially the entire region of the membrane on the outer surface, from the viewpoint of avoiding wetting due to the hydrophobicity of the porous hollow fiber membrane. The water contact angle is a representation of hydrophobicity, and it has no particular upper limit, although in realistic terms the upper limit will be about 150°. As mentioned above, in order to inhibit wetting it is important not only for the membrane to have hydrophobic properties as a whole but also to have improved membrane properties at the locations that are prone to wetting. According to one aspect, a hydrophobic polymer is adhered onto part or all of the length of the membrane, so that the membrane surface exhibits hydrophobicity in a stable manner. The hydrophobic polymer may be adhered onto at least parts of some or all of the inner surface, outer surface and communicating pore surfaces, in the cross-sectional direction of the membrane.

According to the disclosure, the water contact angle is the value measured by the droplet method. In the droplet method, 2 µL of purified water is dropped onto an object to be measured (i.e. the outer surface of the porous hollow fiber membrane), and the angle formed between the object to be measured and the droplet is analyzed from a projection image and digitized.

Referring to FIG. 1A, FIG. 1B and FIG. 3A, according to one aspect, when the locations from one end E1 to the other end E2 in the lengthwise direction of the non-adhesively anchored locations NA of the porous hollow fiber membranes 12 are represented as 0% to 100%, either or both, and preferably both, the amount of hydrophobic polymer per membrane area adhering to locations at 0 to 5% from the one end E1 and the amount of hydrophobic polymer per membrane area adhering to locations at 95 to 100% from the one end are greater than the amount of hydrophobic polymer per membrane area adhering to locations at 40 to 60% from the one end. From the viewpoint of inhibiting wetting it is effective for the hydrophobic polymer to adhere in a suitable amount also in areas other than the borders between the adhesively anchored locations A and the non-adhesively anchored locations NA. However, adhesion of the hydrophobic polymer in a large amount across the entire membrane will reduce vapor permeation and lower water production performance as a membrane distillation device. If either or both, and preferably both, the amount of hydrophobic polymer per membrane area adhering to locations at 0 to 5% from the one end E1 of the membrane and the amount of hydrophobic polymer per membrane area adhering to locations at 95 to 100% from the one end E1 are greater than the amount of hydrophobic polymer per membrane area adhering at locations at 40 to 60% from the one end E1 (i.e. the center section in the lengthwise direction of the membrane), then it will be possible to inhibit wetting while obtaining a membrane distillation device with high vapor permeation. The hydrophobic polymer may be adhering or not adhering at the center section, and the water contact angle may be 90° or greater throughout the entire length of the membrane.

In a porous hollow fiber membrane according to one aspect, the hydrophobic polymer is adhering to the regions of preferably 0 to 5% and 95 to 100%, or 0 to 10% and 90% to 100%, or 0 to 15% and 85 to 100%, of the entirety of the adhesively anchored locations A and the entire length of the non-adhesively anchored locations NA at the center side in the lengthwise direction from both the one end E1 and the other end E2 among the non-adhesively anchored locations NA, while in the other regions the hydrophobic polymer is either adhering in a smaller amount (per membrane area) than those regions, or the hydrophobic polymer is not adhering.

In the module for membrane distillation according to one aspect, the raw water introduction unit is disposed so that the non-adhesively anchored locations of the porous hollow fiber membrane are nearest to the raw water introduction unit at locations within less than 50% from the one end E1, preferably the amount of hydrophobic polymer per membrane area adhering to locations at 0 to 20% from the one end E1 of the porous hollow fiber membrane is greater than the amount of hydrophobic polymer per membrane area adhering to locations at 40 to 60% from the one end E1 (that is, the center section in the lengthwise direction of the membrane), and more preferably the amount of hydrophobic polymer per membrane area of the porous hollow fiber membrane satisfies the following relationship:

[Amount of hydrophobic polymer at locations at 0to20% from the one end E1]>[amount of hydrophobic polymer at locations at 95to100% from the one end E1]>[amount of hydrophobic polymer at locations at 40to60% from the one end E1].

The numerical values (%) for the locations of the porous hollow fiber membrane of the disclosure may have error of about ±2% considering inconsistencies in coating of the hydrophobic polymer that can occur during actual production of the module.

In the module for membrane distillation according to one aspect, wetting is inhibited by equalizing the amount of vapor generated in the lengthwise direction of the membrane. High-temperature raw water introduced into the membrane module is partially deprived of its heat of vaporization when converted to vapor, and therefore the raw water temperature falls as it flows inside the membrane module. Since little vapor is generated at locations of the membrane in contact with the raw water with reduced temperature, generation of vapor in the membrane module differs depending on the location of the membrane, resulting in a distribution.

Figure 4:
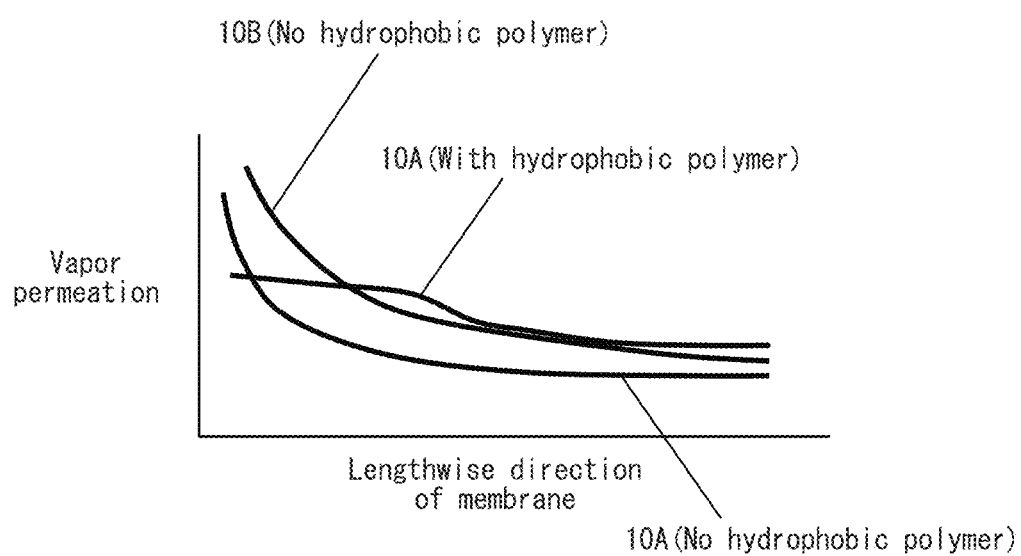
FIG. 4 is an image diagram showing the relationship between lengthwise position and vapor permeation for a porous hollow fiber membrane of module for membrane distillations 10A, 10B.

FIG. 4 is an image diagram showing the relationship between lengthwise position and vapor permeation for a porous hollow fiber membrane of module for membrane distillations 10A, 10B. When a hydrophobic polymer is not used in the construction of the module for membrane distillation 10A shown in FIG. 1A, since raw water is introduced into the module from one end of the membrane, more vapor is generated from the region near the borders between the adhesively anchored locations and the non-adhesively anchored locations, at that one end. Even when a hydrophobic polymer is not used in the module for membrane distillation 10B shown in FIG. 1B, vapor permeation is greater at the locations near the one end and other end of the membrane due to lower pressure loss in the tubes inside the hollow fiber membrane at the locations near the one end and other end. Based on extensive research, the present inventors have found that wetting tends to occur at the locations of the membrane with high vapor generation.

However, wetting can be satisfactorily prevented if the hydrophobic polymer is adhered onto the locations with high vapor generation to lower the evaporation at those locations, thus maximally evening out vapor permeation in the lengthwise direction of the membrane. FIG. 4 shows the relationship between lengthwise position and vapor permeation for a porous hollow fiber membrane, in a module for membrane distillation 10A having a hydrophobic polymer 14 as shown in FIG. 3A (the vapor permeation is lower near the raw water introduction unit in the lengthwise direction of the membrane).

The hydrophobic polymer is preferably provided near the raw water introduction unit. According to one aspect, the hydrophobic polymer may be selectively coated on the raw water introduction unit, and near the borders between the adhesively anchored locations and the non-adhesively anchored locations. According to one aspect, the coating amount of the hydrophobic polymer on the raw water introduction unit may be further increased after the hydrophobic polymer has been coated over the entire hollow fiber membrane. A large coating amount of the hydrophobic polymer over the entire hollow fiber membrane is not desirable as it will lower the overall amount of vapor generation.

According to one aspect, the adhesion of the hydrophobic polymer may have a gradient in the thickness direction of the porous hollow fiber membrane. According to a preferred aspect, the amount of hydrophobic polymer gradually decreases from the raw water introduction end to the product water delivery end.

Figure 5A:
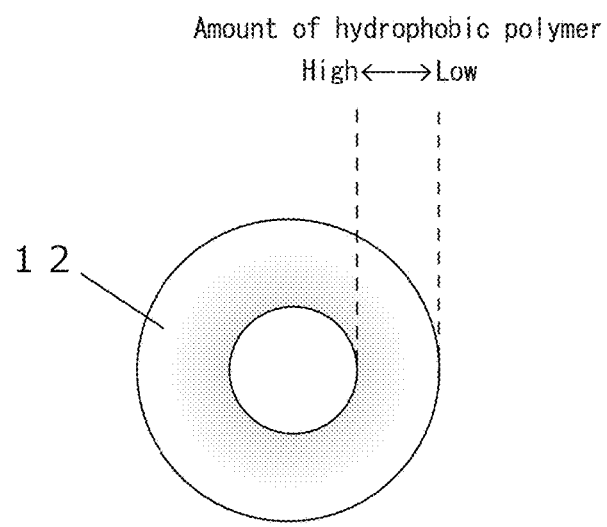
FIG. 5A is a diagram showing a diameter cross section of a porous hollow fiber membrane according to one aspect of the disclosure.
Figure 5B:
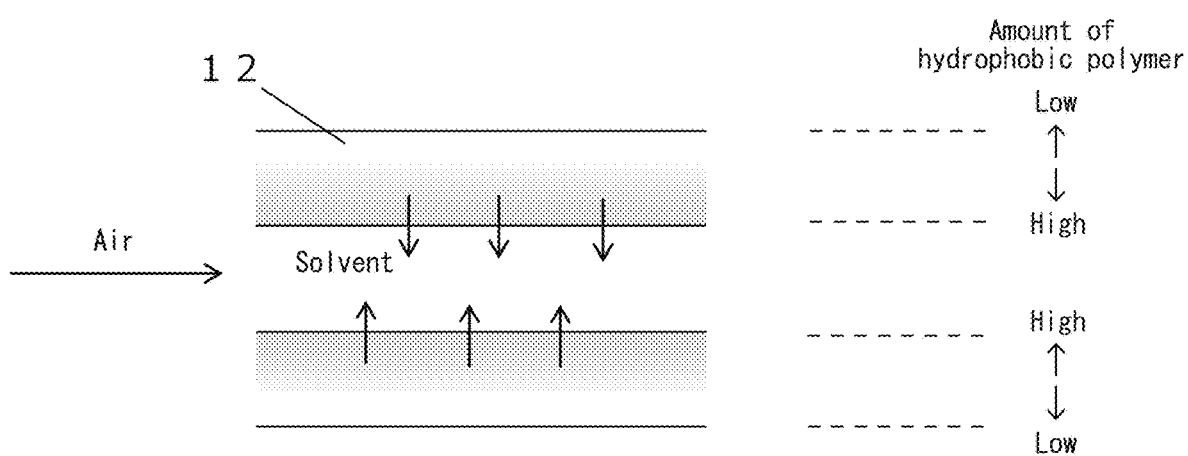
FIG. 5B is a diagram showing a lengthwise cross-section of the porous hollow fiber membrane shown in FIG. 5A.

FIG. 5A is a diagram showing a diameter cross section of a porous hollow fiber membrane according to one aspect of the disclosure, and FIG. 5B is a diagram showing a lengthwise cross-section of the porous hollow fiber membrane shown in FIG. 5A. Referring to FIG. 5A and FIG. 5B, the amount of hydrophobic polymer per membrane area according to one aspect is highest on the inner surface and gradually lower toward the outer surface. Such a gradient is preferred in a construction in which raw water flows inside the porous hollow fiber membrane. In a construction in which raw water flows on the outside of the porous hollow fiber membrane, however, preferably the amount of hydrophobic polymer per membrane area gradually increases from the inner surface toward the outer surface of the porous hollow fiber membrane. The method of forming the desired distribution for the amount of hydrophobic polymer in the thickness direction of the membrane may be, for example, a method of coating the hydrophobic polymer onto the membrane while it is dissolved in a solvent and then drying the solvent by evaporation, during which time the evaporation conditions are designed in such a manner that more solvent evaporation takes place at the regions of the inside and outside of the membrane where higher concentration is desired. Referring to FIG. 5B, if drying is carried out while causing the drying air to flow only on the inside of the porous hollow fiber membrane, for example, more solvent evaporation will take place inside the membrane and more hydrophobic polymer will adhere onto the inside of the membrane.

According to a preferred aspect, the amount of hydrophobic polymer on the surface at the raw water introduction end of the porous hollow fiber membrane is greater than the amount of hydrophobic polymer on the surface at the vapor delivery end of the porous hollow fiber membrane, preferably at locations at 0 to 20%, locations at 0 to 25% or locations at 0 to 30% from one end of the non-adhesively anchored locations of the membrane.

The average pore diameter of the hollow fiber membrane is preferably within 0.01 µm to 1.0 µm, and more preferably within 0.03 µm to 0.6 µm. If the average pore diameter is 0.01 µm or greater the purified water production rate will be satisfactory without excessive vapor permeation resistance, and if it is 1.0 µm or lower the inhibiting effect against wetting will be satisfactory. The average pore diameter is the value measured by the half-dry method according to ASTM: F316-86.

From the viewpoint of both the purified water production rate and wetting inhibition, the membrane preferably has a narrower pore size distribution. Specifically, the pore size distribution as the ratio of the maximum pore diameter to the average pore diameter is preferably in the range of 1.2 to 2.5 and more preferably in the range of 1.2 to 2.0. The maximum pore diameter is the value measured using the bubble point method.

From the viewpoint of obtaining a satisfactory purified water production rate, the void percentage of the hollow fiber membrane is preferably 50% or greater, more preferably 60% or greater and even more preferably 70% or greater, and from the viewpoint of satisfactorily maintaining strength of the membrane itself and helping to avoid problems such as fracture during prolonged use, it is preferably 85% or lower, more preferably 83% or lower and even more preferably 80% or lower. The void percentage is the value measured by the method described under "Examples" in the present disclosure.

From the viewpoint of obtaining a satisfactory purified water production rate, for both the inner surface and outer surface, the surface opening ratio of the hollow fiber membrane is preferably 15% or greater, more preferably 18% or greater and even more preferably 20% or greater, and from the viewpoint of satisfactorily maintaining strength of the membrane itself and helping to avoid problems such as fracture during prolonged use, it is preferably 60% or lower, more preferably 55% or lower and even more preferably 50% or lower. The surface opening ratio is the value determined by using image analysis software to detect holes in an observation image taken with a scanning electron microscope (SEM), on both the inner surface and outer surface.

The outer diameter of the hollow fiber membrane may be 300 µm to 5,000 µm and preferably 350 µm to 4,000 µm, for example, and the inner diameter of the hollow fiber membrane may be 200 µm to 4,000 µm and preferably 250 µm to 3,000 µm, for example.

For this embodiment, from the viewpoint of both the water permeability during membrane distillation and the membrane mechanical strength, the membrane thickness of the porous membrane is preferably 10 µm to 1000 µm and more preferably 15 µm to 1000 µm. Limiting the membrane thickness to no greater than 1000 µm can help prevent reduction in permeated water production efficiency. A membrane thickness of 10 µm or greater, on the other hand, can prevent deformation of the membrane even during use under reduced pressure.

The main constituent material of the porous hollow fiber membrane for the embodiment is a relatively hydrophobic material (that is, a material with relatively low affinity for water). The constituent materials of the membrane may include one or more resins selected from the group consisting of polysulfone, polyethersulfone, polyethylene, polypropylene, polyvinylidene fluoride, polytetrafluoroethylene, ethylene-ethylene tetrafluoride copolymer and polychlorotrifluoroethylene. From the viewpoint of hydrophobicity, film formability and mechanical and thermal durability, polyvinylidene fluoride, ethylene-ethylene tetrafluoride copolymer and polychlorotrifluoroethylene are preferred. It is more preferred to remove impurities such as plasticizer by scouring after production of the resin (after polymerization) or after formation of the membrane.

[Hydrophobic Polymer]

According to one aspect, the hydrophobic polymer is adhering to at least some of the locations of the porous hollow fiber membrane. The hydrophobic polymer can form a hydrophobic coating film on the inner surface, the outer surface and/or membrane interior of the porous hollow fiber membrane, imparting water-repellency to the membrane or increasing the water-repellency of the membrane.

The term "hydrophobic polymer" for the purpose of the disclosure means a polymer with low affinity for water, and examples are polymers having a hydrophobic structure (for example, non-polar (or low-polar) groups such as hydrocarbon groups or fluorinated groups, and non-polar (or low-polar) backbones such as hydrocarbon main chains and siloxane main chains). Preferred hydrophobic polymers include hydrocarbon-based polymers, and unmodified or modified (such as hydrocarbon-modified and/or amino-modified) silicone-based polymers and fluorine-containing polymers (for example, fluorine group-containing polymers), with more specifically preferred examples including the following:

(a) Polymers with siloxane bonds (for example, dimethylsilicone gels, methylphenylsilicone gels, reactive modified silicone gels with introduced organic functional groups (amino groups or fluoroalkyl groups), and silicone-based polymers and polymer gels that form crosslinked structures by reaction with silane coupling agents, and (b) Polymers with (per)fluoroalkyl, (per)fluoropolyether, alkylsilyl or fluorosilyl groups on side chains (in the form of solutions or thin-films), among which polymers of (meth)acrylate-based monomers and/or vinyl-based monomers having (per)fluoroalkyl and/or (per)fluoropolyether groups of 1 to 12 carbon atoms are especially preferred as hydrophobic polymers.

[Hydrophobic Polymer Adhesion Amount]

The amount of adhesion of the hydrophobic polymer per area of the hollow fiber membrane can be determined as the direct weight, by removing the solvent after extraction with a solvent capable of dissolving the hydrophobic polymer, using a procedure such as evaporation. The weight is divided by the membrane area determined from the inner diameter or outer diameter and the length of the hollow fiber membrane, to calculate the amount of hydrophobic polymer per membrane area.

For determining the adhesion with an analysis device, a surface analyzer may be used to determine the adhesion from the signal intensity ratio between each porous hollow fiber membrane and hydrophobic polymer on both the inner surface and outer surface of the porous hollow fiber membrane. The amount of hydrophobic polymer per membrane area is defined as being represented by the average value for the inner surface and outer surface. A surface analyzer allows compositional analysis of only the surface layer of the hollow fiber membrane which has a porous structure, and therefore the hydrophobic polymer adhesion per membrane area of the hollow fiber membrane can be estimated from the signal intensity ratio. With analysis results for a blank, as a porous hollow fiber membrane coated with a known amount of hydrophobic polymer, it is possible to quantitatively determine the adhesion amount for its calibration curve. Even without a blank coated with a known amount, by comparing the intensity ratio for: (signal from hydrophobic polymer/signal from porous hollow fiber membrane) for multiple arbitrarily selected locations of the porous hollow fiber membrane, setting the value of the signal intensity ratio at the location exhibiting the minimum signal intensity ratio to be 1 (although this will be 0 when the minimum for the signal intensity ratio is 0 (that is, no hydrophobic polymer present)), locations with a signal intensity ratio of greater than 1.2 may be judged to be locations with a high hydrophobic polymer coating amount. The analysis device may be a surface analyzer such as an IR (infrared ray spectrum absorption) analyzer, an XPS (X-ray photoelectron spectroscopy) analyzer or a TOF-SIMS (time-of-flight secondary ion) analyzer.

[Adhesive Resin]

The adhesive resin for adhesive anchoring of the porous hollow fiber membranes is preferably one with satisfactory mechanical strength and having heat resistance at 100° C. Examples of resins that may be used as adhesive resins include thermosetting epoxy resins and thermosetting urethane resins. Epoxy resins are preferred from the viewpoint of heat resistance, and urethane resins are preferred from the viewpoint of handleability. The method of adhesive anchoring may be a bonding method that is known for fabrication of module for membrane distillations.

[Housing]

The housing material is selected from the viewpoint of pressure resistance, heat resistance, impact resistance and weather resistance. Resins and metals may be used, but from the viewpoints mentioned above the material is preferably selected from among resin groups comprising polypropylene, polysulfone, polyethersulfone, polyvinylidene fluoride, ABS resins, fiber-reinforced plastic and vinyl chloride resins, or metals such as stainless steel, brass and titanium.

The housing may also have a cooling function that cools generated vapor, converting it to purified water. This is preferred as it allows omission of tubing for passage of the vapor. When the housing includes a cooler with a cooling function, the module for membrane distillation is installed with the hollow fiber membranes oriented essentially perpendicular (or nearly perpendicular), with a barrier situated between the hollow fiber membranes and the cooler at a position higher than ½ of the total length of the membranes, thus helping to inhibit impairment in the water quality of purified water by minor wetting.

[Membrane Distillation Device]

The embodiment also provides a membrane distillation device for water production comprising a module for membrane distillation according to the present disclosure. According to one aspect, the membrane distillation device comprises porous hollow fiber membranes and a heater that heats raw water or an evaporator that causes evaporation of raw water. Optionally, the membrane distillation device may also comprise, in addition to the porous hollow fiber membranes and the heater or evaporator, a condensing unit that causes condensation of the water vapor that has passed through the porous hollow fiber membranes, tubes for transport of raw water or permeated water, and a gas phase unit for delivery of water vapor.

Figure 6A:
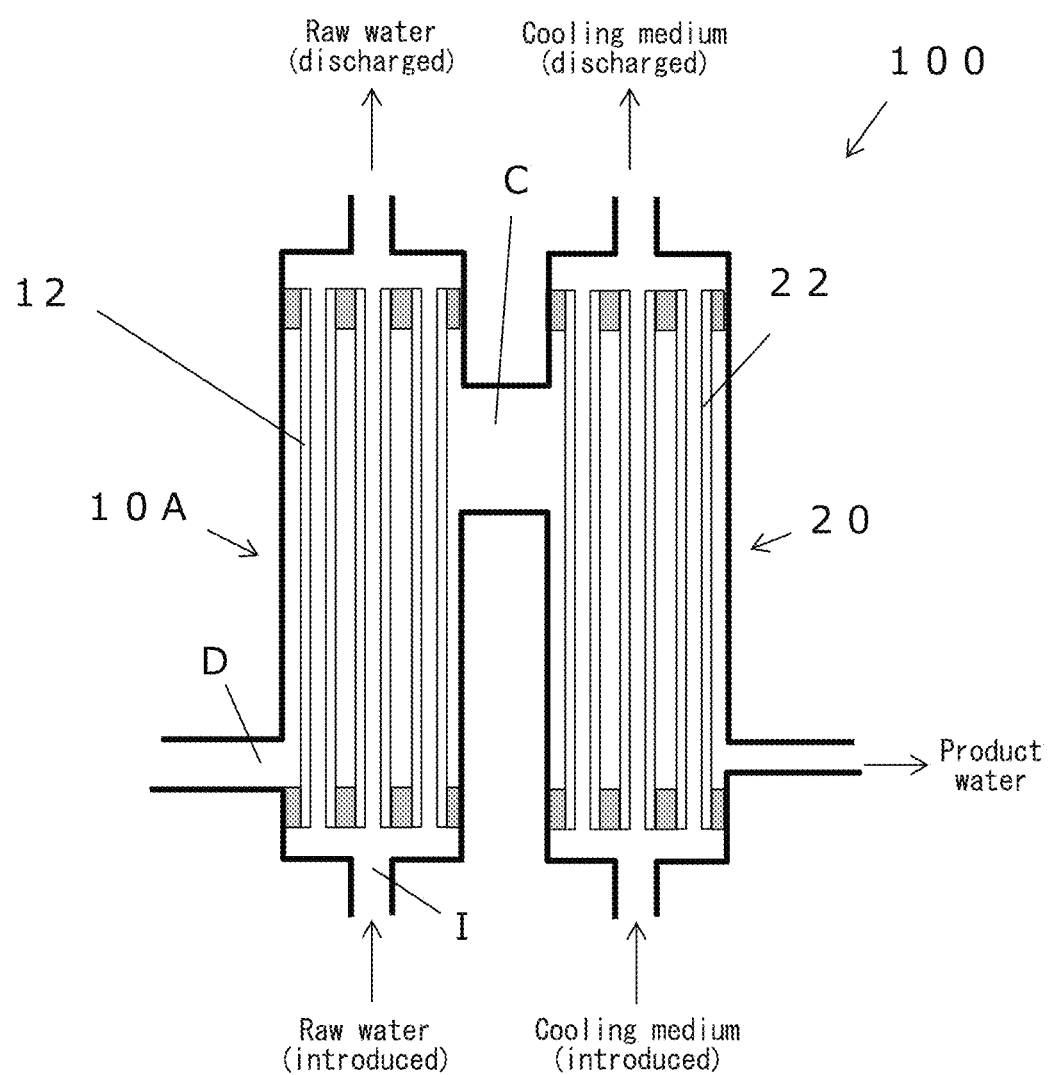
FIG. 6A is a schematic view showing a membrane distillation device according to one aspect of the disclosure.

FIG. 6A and FIG. 6B are schematic views showing a membrane distillation device according to one aspect of the disclosure. Referring to FIG. 6A, the membrane distillation device 100 preferably comprises a module for membrane distillation 10A and a cooling device 20 connected to it. According to a preferred aspect, the module for membrane distillation 10A is constructed with porous hollow fiber membranes 12 each anchored in essentially the vertical direction with one end directed downward, and in a manner so that raw water is introduced from the one end into the insides of the porous hollow fiber membranes 12, while the lower end of the connecting member C (connection port) between the porous hollow fiber membranes 12 and the cooling device 20 is at a position higher than ½ of the total height of the non-adhesively anchored locations of the porous hollow fiber membranes. This allows water quality impairment to be avoided during production of purified water even if a slight degree of wetting occurs, for the following reason. Specifically, wetting in a membrane distillation device begins from the region near the raw water introduction unit. In the apparatus illustrated in FIG. 6A, the raw water introduction unit I is at the bottom of the module for membrane distillation 10A. When the lower end of the connecting member C is at a position higher than ½ of the total height of the non-adhesively anchored locations of the porous hollow fiber membranes 12, the distance of the connecting member C from the raw water introduction unit I is longer, so that even when raw water has exuded out from the hollow fiber membranes by wetting, it is possible for the vapor alone to reach the cooling device 20 in order to obtain the desired purified water, without the raw water or its droplets reaching the connecting member.

Referring to FIGS. 6A and B, the membrane distillation device 100, 200 preferably has a discharge port D in the housing at the bottom of the module for membrane distillation 10A (specifically, a position in the vertical direction corresponding to a position lower than ½ of the total height of the non-adhesively anchored locations of the porous hollow fiber membranes), where wetted liquid is discharged. With the discharge port D, raw water that has seeped out from the porous hollow fiber membranes can be manually or automatically eliminated during operation, thus allowing operation to be continued for longer periods even when wetting has occurred. The discharge port D may also be connected to a drain tank 30 as in the membrane distillation device 200 illustrated in FIG. 6B.

[Membrane Distillation System]

The membrane distillation device of the embodiment may be used in membrane distillation (MD).

Figure 7:
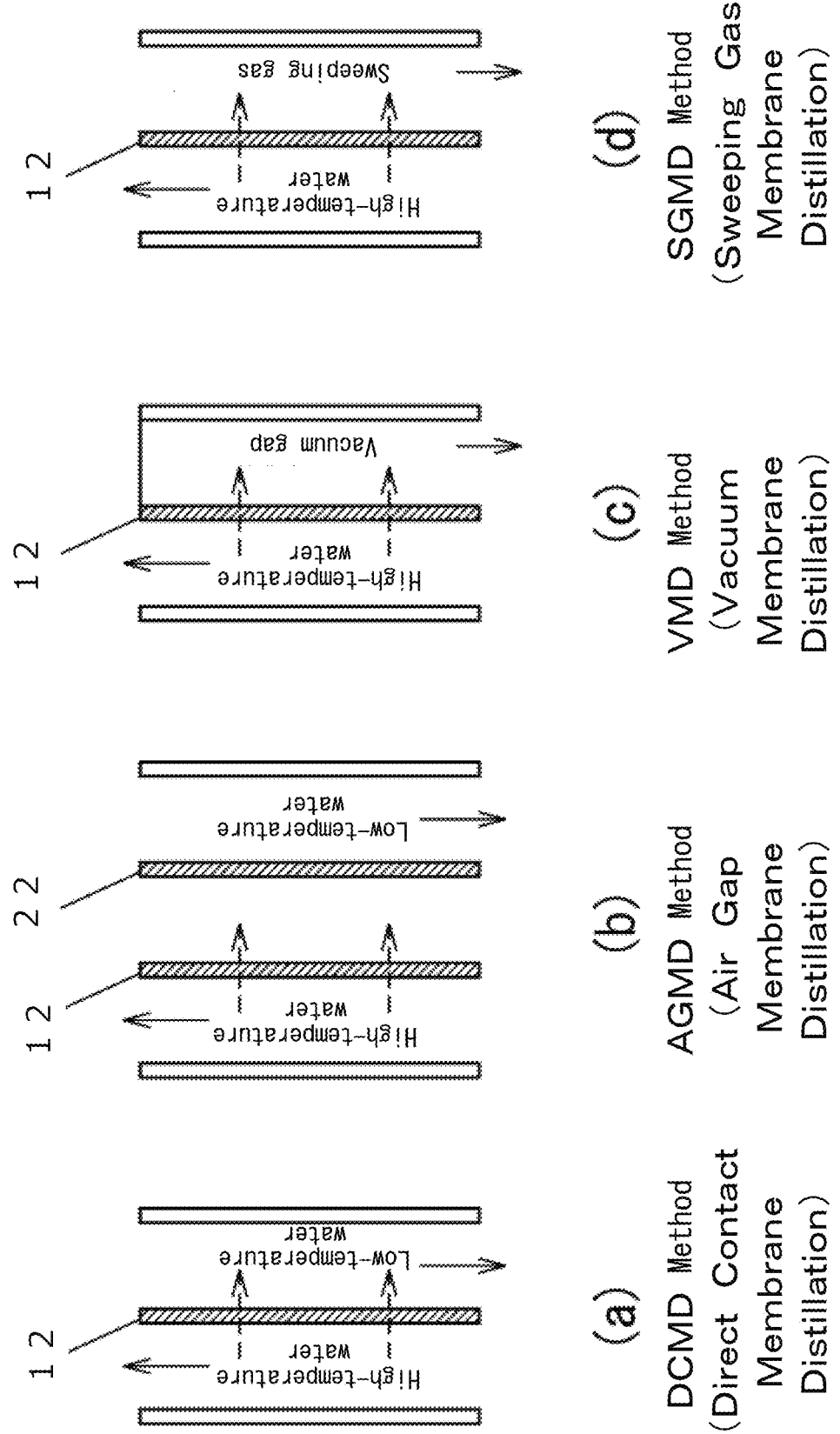
FIG. 7 is a schematic view illustrating different membrane distillation methods.

FIG. 7 is a schematic view illustrating different membrane distillation methods. Referring to FIG. 7, membrane distillation methods are based on any of the following 4 main principles.

(a) The DCMD (Direct Contact Membrane Distillation) method in which water vapor generated by an evaporator is directly taken up into a condensing unit (cooling device) through porous hollow fiber membranes 1.

(b) The AGMD (Air Gap Membrane Distillation) method in which a third gas phase unit is provided between the evaporator and condensing unit, and water vapor is condensed from the evaporator onto the surface of the cooling unit 2 to obtain distilled water.

(c) The VMD (Vacuum Membrane Distillation) method in which a vacuum gap is provided in a third gas phase unit and water vapor is caused to migrate from the evaporator to the condensing unit to obtain distilled water.

(d) The SGMD (Sweeping Gas Membrane Distillation) method in which sweeping gas is caused to flow to a third gas phase unit and water vapor is caused to migrate from the evaporator to the condensing unit to obtain distilled water.

A VMD system, shown in FIG. 7(c), is most preferred among these because it allows stable permeated water quality to be obtained. High-temperature water is shown as the raw water in FIG. 7, but the design may be such that the raw water is at a temperature near room temperature and the low-temperature water and the condensing unit are at a temperature lower than room temperature.

[Rinsing of Membrane]

When a module for membrane distillation of this embodiment is used for prolonged operation in which permeated water is produced, the through-holes of the membranes may become obstructed and the permeated water production efficiency reduced, when inorganic salts, organic materials, microparticles, oils and metals in the water to be treated precipitate or adhere onto the raw water introduction ends of the porous hollow fiber membranes. When this occurs, in some cases the operation is temporarily halted and a solution capable of dissolving substances that can cause clogging is used for a rinsing procedure with high flow on the surfaces and membrane interiors of the porous hollow fiber membranes, to allow the porous hollow fiber membranes to be restored to their initial state. When the substances that can cause clogging are inorganic salts or metals, an acid or the like having the ability to dissolve them may be used. In the case of common calcium carbonate scales, for example, the membranes may be rinsed with a solution of hydrochloric acid or citric acid. When the substances causing clogging are organic materials or microorganisms (slime), rinsing may be carried out using a sodium hypochlorite aqueous solution as an oxidizing agent. When the substance causing clogging consists of microparticles, the microparticles may be eliminated from the membrane surfaces by flowing a rinsing solvent at a high flow rate.

When clogging substances that have precipitated and adhered in the pores of the membranes are to be rinsed off, rinsing may be by a method of hydrophilic wetting of the membranes using an alcohol or a mixture of an alcohol and water, followed by flushing with a rinsing solvent. Alternatively, rinsing may be by applying pressure to the membranes to flush the pore interiors with a solvent. Membrane distillation using fresh water as the water to be treated (raw water) can bring clogging substances to the membrane surfaces, after which the membrane surfaces may be rinsed to remove the clogging substances.

[Use of Membrane Distillation]

The module for membrane distillation and membrane distillation device of the embodiment can be suitably used for the purpose of removing ions, organic materials and inorganic materials present in water to be treated to a high degree of removal, for purification, or for the purpose of removing water from water to be treated, for concentration. Such purposes may include seawater desalination, water production for ships, ultrapure water production (at semiconductor plants), boiler water production (at thermal power plants), fuel cell system water treatment, industrial waste water treatment (at food factories, chemical plants, electronic industrial plants, pharmaceutical plants and cleaning plants), water production for dialysis, production of water for injection, accessory water treatment (for heavy oils, shale oil, shale gas and natural gas, for example) and recovery of valuable materials from seawater. Accessory water includes inorganic salts at from a few percent to several tens of percents and oils at from several ppm to several tens of ppm, based on mass. Natural gas includes, in addition to conventional natural gas obtained from conventional gas fields, also non-conventional natural gas types such as coal bed methane (also known as coal seam gas).

[Combination with Other Techniques]

A pressure module for membrane distillation of the embodiment, and a membrane distillation device comprising it, may be used as a composite system combined with other water treatment technologies. For example, concentrated water produced by treatment using RO (Reverse Osmosis) can be further purified using the membrane distillation device of the embodiment to increase the water yield. The membrane distillation device of the embodiment may also be used as recovering means for a DS (Draw Solution) used in an FO (Forward Osmosis) method.

EXAMPLES

Examples concretely illustrating the construction and effect of the invention will now be described, with the understanding that this embodiment is not in any way limited by the Examples.

<Physical Properties of Porous Hollow Fiber Membranes>

The physical properties of the porous hollow fiber membranes used in the Examples were determined by the following measuring methods.

[Outer Diameter, Inner Diameter and Membrane Thickness]

The outer diameters and inner diameters of the porous hollow fiber membranes were measured by thinly slicing them with a razor in the direction perpendicular to the lengthwise direction of the hollow fiber membranes, and using a microscope to determine the outer diameters and inner diameters of the cross-sections. The membrane thickness was calculated by the following formula (1).

$$\text{Membrane thickness [mm]}=(\text{Outer diameter [mm]}-\text{inner diameter [mm]})/2 \qquad (1)$$

[Average Pore Diameter of Porous Hollow Fiber Membranes]

Measurement was performed by the method of measuring average pore diameter described in ASTM:F316-86 (also known as the "half-dry method").

A porous hollow fiber membrane of approximately 10 cm length was measured, under standard measuring conditions of 25° C. with a pressurization rate of 0.01 atm/sec, using ethanol as the liquid.

The average pore diameter was calculated by the following formula (2).

$$\text{Average pore diameter [μm]}=2860\times(\text{Surface tension of solution used [dyne/cm]})/(\text{half-dry air pressure [Pa]}) \qquad (2)$$

Since the surface tension of ethanol at 25° C. is 21.97 dyne/cm, calculation was by the following formula (3).

$$\text{Average pore diameter [μm]}=62834/(\text{half-dry air pressure [Pa]}) \qquad (3)$$

[Maximum Pore Diameter of Porous Hollow Fiber Membranes]

The maximum pore diameter of the porous hollow fiber membranes was measured using the bubble point method. One end of a porous hollow fiber membrane with a length of 8 cm was closed off, and a nitrogen gas supply line was connected to the other end via a pressure gauge. After supplying nitrogen gas in this state to exchange the line interior with nitrogen, the porous hollow fiber membrane was immersed in ethanol. The porous hollow fiber membrane was immersed while applying slight pressure with nitrogen so that the ethanol did not flow back through the line. With the porous hollow fiber membrane immersed, the nitrogen gas pressure was slowly increased and the pressure P at which nitrogen gas bubbles began to stably emerge from the porous hollow fiber membrane was recorded. Thus, the maximum pore diameter d of each porous hollow fiber membrane was calculated by the following formula (4):

$$d = C_{1\gamma}/P \quad (4)$$

{where $C_1$ is a constant, $\gamma$ is the surface tension and P is the pressure}. With ethanol as the immersion liquid, the maximum pore diameter d (μm) was calculated by substituting P (kg/cm$^2$) into formula (4), with $C_{1\gamma}$=0.632 (kg/cm).

[Void Percentage]

The void percentage of each porous hollow fiber membrane was calculated from the weight of the hollow fiber membrane and the density of the material composing the hollow fiber membrane, based on the methods described below.

The hollow fiber membrane was cut to a prescribed length, the weight was measured, and the void percentage was calculated by the following formula (5):

Void percentage [%]=100−(hollow fiber weight [g]× 100)/(Polymer density [g/cm$^3$]×((outer diameter [cm]/2)$^2$−(inner diameter [cm]/2)$^2$)×3.14×length [cm])  (5)

[Comparison of Hydrophobic Polymer Adhesion Amounts]

The hydrophobic polymer adhesions were compared by IR spectrum analysis and ATR (attenuated total reflectance, interior reflection), using ZnSe crystals as the prism. The measuring apparatus used was a Spectrum 1 by PerkinElmer, and the crystal pressing pressure was with a pressure contour of about 30. By determining the ratio between the peak intensity attributed to the hydrophobic polymer and the peak intensity attributed to the membrane material, it is possible to determine the amount of hydrophobic polymer adhering to the membrane surface. For the Examples, since the side chains were acrylates with perfluoro groups, the peak intensity ratio between vC=O at 1734 Hz$^{-1}$ and (vC-F+vC-O) at near 1180 Hz$^{-1}$ was calculated to be: vC=O/(vC-F+vC-O). A membrane to be used for adhesion measurement was cut out from the module and the hollow fiber membrane was cut at 1 cm spacings in the lengthwise direction. The sample itself was used for analysis of the membrane outer surface, and the membrane was cut in the lengthwise direction for analysis of the inner surface.

The peak intensity ratio was measured for different locations of the membrane, defining the minimum as 1.0 and judging adhesion of greater than 1.2 times that to be high adhesion.

Example 1

Figure 8:
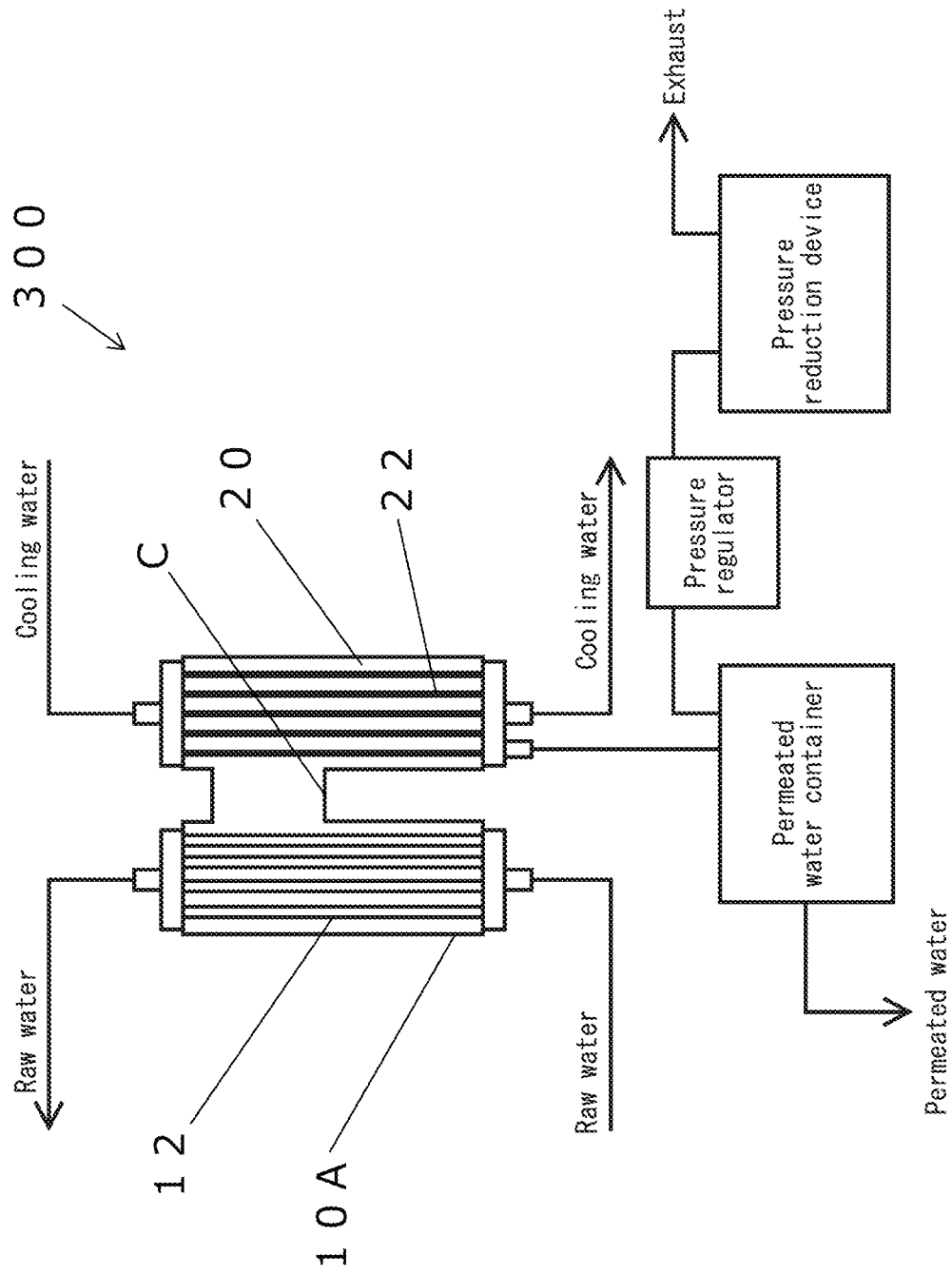
FIG. 8 is a schematic view showing the construction of the membrane distillation device used in Example 1.

FIG. 8 is a schematic view showing the construction of the membrane distillation device 300 used in Example 1. A PVDF porous hollow fiber membrane 12 having an inner diameter of 0.7 mm, an outer diameter of 1.3 mm, an average pore diameter of 0.21 μm determined according to ASTM-F316-86, a maximum pore diameter of 0.29 μm and a void percentage of 72% was cut to a length of 15 cm. The porous hollow fiber membrane 12 was completely immersed once in the fluorine resin-based water-repellent agent FG-1610-F130(0.5) by Fluorotechnology Co., as a hydrophobic polymer, and then raised out and allowed to dry. The hydrophobic polymer was then again coated onto locations from each end of the 15 cm-long membrane to about 4 cm toward the center in the lengthwise direction and dried, leaving a 7 cm part at the center section in the lengthwise direction that was not recoated. The hydrophobic polymer used for recoating was the fluorine resin-based water-repellent agent SFE-DP02H by AGC Seimi Chemical Co., Ltd.

For fabrication of modules, a thermosetting epoxy resin was used as the adhesive resin and the hollow fiber membranes were adhesively anchored inside the housing by centrifugal bonding. As a result, the hollow fiber membranes were anchored with non-adhesively anchored location lengths of about 10 cm, and a 7 cm part where the hydrophobic polymer was not recoated at a central position in the lengthwise direction of the module. The number of hollow fiber membranes was adjusted for a total membrane area of about 50 cm$^2$ for the inner surfaces (inside facing surfaces) of the hollow fiber membranes. Three module for membrane distillations 10A were fabricated with these specifications.

One of the module for membrane distillations 10A obtained by this method was disassembled and the porous hollow fiber membrane properties were measured. The water contact angle of the porous hollow fiber membrane was determined by dropping 2 μL of purified water under conditions with a temperature of 23° C. and a relative humidity of 50%, and calculating the angle formed between the droplet and the hollow fiber membrane outer surface by image analysis, as the contact angle. Measurement was conducted 5 times and the number-average value was calculated. In all cases, the contact angle on the hollow fiber membrane outer surface was 113° at the sections of 5 mm from each of the adhesive interfaces at both ends of the module (that is, the borders between the adhesively anchored locations and non-adhesively anchored locations of the membrane) toward the lengthwise center, and 108° at the center sections in the lengthwise direction.

When the peak intensity ratio of vC=O at 1734 Hz$^{-1}$ and (vC-F+vC-O) at 1180 Hz$^{-1}$ (vC=O/(vC-F+vC-O)) was calculated, using IR ATR, the intensity ratio on both the outer surface and inner surface of the membrane was found to be 0.06 at the locations at 5 mm from the adhesive interfaces at both ends toward the lengthwise center, but 0.02 at the center section in the lengthwise direction on both the outer surface and inner surface, indicating that the amount of hydrophobic polymer adhesion was high near the adhesive interfaces at both ends.

The fabricated module for membrane distillation was used to form a membrane distillation device 300 having the construction shown in FIG. 8. Evaluation was conducted by MD operation for 1000 hours under the following conditions, and the electric conductivity of the product water was measured. When the electric conductivity exceeded 500 μS/cm it was assumed that wetting had occurred, and the evaluation was therefore stopped.

[Evaluation Conditions]

Raw water: 3.5 mass % brine
Circulating flow rate in membranes: 600 ml/min
Raw water temperature (module inlet end): 70° C. (conditions 1), 90° C. (conditions 2)
Cooling water temperature: 15° C.
Cooling water circulating flow rate: 1000 ml/min
Product water side vacuum degree: −90 kPaG

[Electric Conductivity of Product Water After 1000 Hours]

Table 1 shows the electric conductivity of product water after operation of each membrane distillation device for 1000 hours.

At a raw water temperature of 70° C. (conditions 1), the electric conductivity of the product water after 1000 hours was 5 μS/cm, and with a raw water temperature of 90° C. (conditions 2), the electric conductivity of the product water after 1000 hours was 10 μS/cm, both of which indicated satisfactory water quality and lack of wetting.

Example 2

A porous hollow fiber membrane similar to Example 1 was cut to a length of 15 cm. The porous hollow fiber membrane was completely immersed once in the fluorine resin-based water-repellent agent FG-1610-F130(0.5) by Fluorotechnology Co., as a hydrophobic polymer, and then raised out and allowed to dry. The hydrophobic polymer was then again coated onto locations from each end of the 15 cm-long membrane to about 4 cm toward the center in the lengthwise direction, dried, and then recoated onto a 7 cm part at the center section in the lengthwise direction. The hydrophobic polymer for recoating was likewise FG-1610-F130(0.5).

Modules were fabricated in the same manner as Example 1. A thermosetting epoxy resin was used as the adhesive resin and the hollow fiber membranes were adhesively anchored inside the housing by centrifugal bonding. As a result, the hollow fiber membranes were anchored with non-adhesively anchored location lengths of about 10 cm, and a 7 cm part where the hydrophobic polymer was not recoated at a central position in the lengthwise direction of the module. The number of hollow fiber membranes was adjusted for a total membrane area of about 50 cm$^2$ for the inner surfaces of the hollow fiber membranes. Three module for membrane distillations were fabricated with these specifications.

One of the module for membrane distillations 10A obtained by this method was disassembled and the porous hollow fiber membrane properties were measured. The water contact angle of the porous hollow fiber membrane was determined by dropping 2 μL of purified water under conditions with a temperature of 23° C. and a relative humidity of 50%, and calculating the angle formed between the droplet and the hollow fiber membrane outer surface by image analysis, as the contact angle. Measurement was conducted 5 times and the number-average value was calculated. In all cases, the contact angle on the hollow fiber membrane outer surface was 110° at the sections of 5 mm from each of the adhesive interfaces at both ends of the module (that is, the borders between the adhesively anchored locations and non-adhesively anchored locations of the membrane) toward the lengthwise center, and 108° at the center sections in the lengthwise direction.

When the peak intensity ratio of vC=O at 1734 Hz$^{-1}$ and (vC-F+vC-O) at 1180 Hz$^{-1}$ (vC=O/(vC-F+vC-O)) was calculated, using IR ATR, the intensity ratio on both the outer surface and inner surface of the membrane was found to be 0.03 at the locations at 5 mm from the adhesive interfaces at both ends of the module toward the lengthwise center, but 0.02 at the center section in the lengthwise direction on both the outer surface and inner surface, indicating that the amount of hydrophobic polymer adhesion was high near the adhesive interfaces at both ends.

[Electric Conductivity of Product Water After 1000 Hours]

When the construction of the membrane distillation devices and the electric conductivity of product water after operation for 1000 hours were determined in the same manner as Example 1, the electric conductivity of the product water after 1000 hours at a raw water temperature of 70° C. (conditions 1) was 8 μS/cm and the electric conductivity of the product water after 1000 hours at a raw water temperature of 90° C. (conditions 2) was 12 μS/cm, indicating satisfactory water quality and lack of wetting.

Example 3

A porous hollow fiber membrane similar to Example 1 was cut to a length of 15 cm. The porous hollow fiber membrane was completely immersed once in the fluorine resin-based water-repellent agent FS-392B by Fluorotechnology Co., as a hydrophobic polymer, and then raised out and allowed to dry. The hydrophobic polymer was then again coated onto locations from each end of the 15 cm-long membrane to about 4 cm toward the center in the lengthwise direction, dried, and then recoated onto a 7 cm part at the center section in the lengthwise direction. The hydrophobic polymer used for recoating was the fluorine resin-based water-repellent agent SFE-DP02H by AGC Seimi Chemical Co., Ltd.

Modules were fabricated in the same manner as Example 1. A thermosetting epoxy resin was used as the adhesive resin and the hollow fiber membranes were adhesively anchored inside the housing by centrifugal bonding. As a result, the hollow fiber membranes were anchored with non-adhesively anchored location lengths of about 10 cm, and a 7 cm part where the hydrophobic polymer was not recoated at a central position in the lengthwise direction of the module. The number of hollow fiber membranes was adjusted for a total membrane area of about 50 cm$^2$ for the inner surfaces of the hollow fiber membranes. Three module for membrane distillations were fabricated with these specifications.

The location of the fabricated module from the end face on the raw water inflow side to 3 cm in the lengthwise direction was completely immersed in the fluorine resin-based water-repellent agent FG-1610-C (2.0) by Fluorotechnology Co., as a hydrophobic polymer, and after draining off the liquid, air was allowed to flow over the inside and outside of the hollow fiber membrane at 30 L/min for drying.

One of the module for membrane distillations obtained by this method was disassembled and the porous hollow fiber membrane properties were measured. The water contact angle of the porous hollow fiber membrane was determined by dropping 2 μL of purified water with a temperature of 23° C. and a relative humidity of 50%, and calculating the angle formed between the droplet and the hollow fiber membrane outer surface by image analysis, as the contact angle. Measurement was conducted 5 times and the number-average value was calculated. The contact angle on the outer surface of the hollow fiber membranes was 125° at the section 5 mm from the adhesive interface on the raw water inflow side toward the center in the lengthwise direction, 115° at the section 5 mm from the adhesive interface on the opposite side toward the center in the lengthwise direction, and 110° at the center section in the lengthwise direction.

When the peak intensity ratio between vC=O at 1734 Hz$^{-1}$ and (vC-F+vC-O) at 1180 Hz$^{-1}$ (vC=O/(vC-F+vC-O)) was calculated by IR ATR for both the inner surface and outer surface, in the range of 0 to 20% in the lengthwise direction from one end of the non-adhesively anchored locations of the membrane, the intensity ratio was found to be 0.09 for both the outer surface and inner surface of the membrane. For the peak intensity ratio in the range of 40 to 60% from the one end, on the other hand, the intensity ratio was found to be 0.02 for both the outer surface and inner surface, while for the peak intensity ratio in the range of 95 to 100% from the one end, the intensity ratio was found to be 0.05 for both the outer surface and inner surface.

[Electric Conductivity of Product Water After 1000 Hours]

When the construction of the membrane distillation devices and the electric conductivity of product water after operation for 1000 hours were determined in the same manner as Example 1, the electric conductivity of the product water after 1000 hours at a raw water temperature of 70° C. (conditions 1) was 2 µS/cm and the electric conductivity of the product water after 1000 hours at a raw water temperature of 90° C. (conditions 2) was 2 µS/cm, indicating satisfactory water quality and lack of wetting.

Example 4

A porous hollow fiber membrane similar to Example 1 was cut to a length of 15 cm. The porous hollow fiber membrane was completely immersed once in the fluorine resin-based water-repellent agent FS-392B by Fluorotechnology Co., as a hydrophobic polymer, and then raised out and allowed to dry. The hydrophobic polymer was then again coated onto locations from each end of the 15 cm-long membrane to about 4 cm toward the center in the lengthwise direction, dried, and then recoated onto a 7 cm part at the center section in the lengthwise direction. The hydrophobic polymer used for recoating was the fluorine resin-based water-repellent agent SFE-DP02H by AGC Seimi Chemical Co., Ltd.

Modules were fabricated in the same manner as Example 1. A thermosetting epoxy resin was used as the adhesive resin and the hollow fiber membranes were adhesively anchored inside the housing by centrifugal bonding. As a result, the hollow fiber membranes were anchored with non-adhesively anchored location lengths of about 10 cm, and a 7 cm part where the hydrophobic polymer was not recoated at a central position in the lengthwise direction of the module. The number of hollow fiber membranes was adjusted for a total membrane area of about 50 cm² for the inner surfaces of the hollow fiber membranes. Three module for membrane distillations were fabricated with these specifications.

The location of the fabricated module from the end face on the raw water inflow side to 3 cm in the lengthwise direction was completely immersed in the fluorine resin-based water-repellent agent FG-1610-F130(2.0) by Fluorotechnology Co., as a hydrophobic polymer, and after draining off the liquid, air was allowed to flow only over the inside of the hollow fiber membrane at 30 L/min for drying.

One of the module for membrane distillations obtained by this method was disassembled and the porous hollow fiber membrane properties were measured. The water contact angle of the porous hollow fiber membrane was determined by dropping 2 µL of purified water with a temperature of 23° C. and a relative humidity of 50%, and calculating the angle formed between the droplet and the hollow fiber membrane outer surface by image analysis, as the contact angle. Measurement was conducted 5 times and the number-average value was calculated. The contact angle on the outer surface of the hollow fiber membranes was 127° at the section 5 mm from the adhesive interface on the raw water inflow side toward the center in the lengthwise direction, 115° at the section 5 mm from the adhesive interface on the opposite side toward the center in the lengthwise direction, and 110° at the center section in the lengthwise direction.

When the peak intensity ratio of vC=O at 1734 Hz$^{-1}$ and (vC-F+vC-O) at 1180 Hz$^{-1}$ (vC=O/(vC-F+vC-O)) was calculated, using IR ATR on the inner surface and outer surface of the membrane in a range of 0 to 20% in the lengthwise direction from one end of the non-adhesively anchored locations, the intensity ratio on the inner surface was 0.15 with respect to an intensity ratio of 0.08 on the outer surface, indicating that the amount of hydrophobic polymer adhesion was high on the inner surface of the membrane that contacted with raw water.

[Electric Conductivity of Product Water After 1000 Hours]

When the construction of the membrane distillation devices and the electric conductivity of product water after operation for 1000 hours were determined in the same manner as Example 1, the electric conductivity of the product water after 1000 hours at a raw water temperature of 70° C. (conditions 1) was 1 µS/cm and the electric conductivity of the product water after 1000 hours at a raw water temperature of 90° C. (conditions 2) was 1 µS/cm, indicating satisfactory water quality and lack of wetting.

Comparative Example 1

A module was fabricated in the same manner as Example 1, except that no hydrophobic polymer was coated onto the module for membrane distillation of Example 1.

One of the module for membrane distillations obtained by this method was disassembled and the porous hollow fiber membrane properties were measured. The water contact angle of the porous hollow fiber membrane was determined by dropping 2 µL of purified water with a temperature of 23° C. and a relative humidity of 50%, and calculating the angle formed between the droplet and the hollow fiber membrane outer surface by image analysis, as the contact angle. Measurement was conducted 5 times and the number-average value was calculated. The contact angle on the outer surface of the hollow fiber membrane was 95° at the sections 5 mm from the adhesive interfaces at both ends toward the lengthwise center, and 95° at the center section in the lengthwise direction.

The peak intensity ratio determined by IR ATR measurement in the same manner as Example 1 gave a result of 0 for both locations.

A membrane distillation device was constructed and operated for 1000 hours in the same manner as Example 1, and the electric conductivity of the product water was measured.

As a result, the electric conductivity after 2 days at a raw water temperature of 70° C. (conditions 1) exceeded 500 µS/cm, with wetting, and the electric conductivity after 3 hours at a raw water temperature of 90° C. (conditions 2) exceeded 500 µS/cm also with wetting.

Comparative Example 2

In the same manner as Example 1, a PVDF porous hollow fiber membrane having an inner diameter of 0.7 mm, an outer diameter of 1.3 mm, an average pore diameter of 0.21 µm, a maximum pore diameter of 0.29 µm and a void percentage of 72% was cut to a length of 15 cm. The porous hollow fiber membrane was completely immersed once in the fluorine resin-based water-repellent agent FG-1610-F-130(0.5) by Fluorotechnology Co., as a hydrophobic polymer, for coating, and then allowed to dry.

A thermosetting epoxy resin was used as the adhesive resin and the hollow fiber membranes were adhesively anchored inside the housing by centrifugal bonding. A module for membrane distillation was fabricated in the same manner as Example 1.

One of the module for membrane distillations obtained by this method was disassembled and the porous hollow fiber membrane properties were measured. The water contact angle of the porous hollow fiber membrane was determined by dropping 2 μL of purified water with a temperature of 23° C. and a relative humidity of 50%, and calculating the angle formed between the droplet and the hollow fiber membrane outer surface by image analysis, as the contact angle. Measurement was conducted 5 times and the number-average value was calculated. The contact angle on the outer surface of the hollow fiber membranes was 110° at the section 5 mm from the adhesive interface on the raw water inflow side toward the center in the lengthwise direction, 110° at the section 5 mm from the adhesive interface on the opposite side toward the center in the lengthwise direction, and 110° at the center section in the lengthwise direction, thus showing equal water contact angles at all of the locations.

As a result of calculating the peak intensity ratio of vC=O at 1734 Hz$^{-1}$ and (vC-F+vC-O) at 1180 Hz$^{-1}$ (vC=O/(vC-F+vC-O)) using IR ATR in the same manner as Example 1, the intensity ratio on the outer surface was 0.02 and the intensity ratio on the inner surface was 0.02 at the locations at 5 mm from the adhesive interfaces at both ends toward the lengthwise center, and 0.02 on both the outer surface and inner surface at the center section in the lengthwise direction, indicating that the intensity ratio was not higher near the adhesive interfaces at both ends.

A membrane distillation device was constructed and operated for 1000 hours in the same manner as Example 1, and the electric conductivity of the product water was measured.

The electric conductivity was 500 μS/cm after 10 days with a raw water temperature of 70° C. (conditions 1), and therefore wetting was judged to have occurred. The electric conductivity of the product water was also 500 μS/cm after 3 days at a raw water temperature of 90° C. (conditions 2) indicating that wetting had occurred.

[Table 1]

TABLE 1

|  | Conditions 1 | Conditions 2 |
|---|---|---|
| Example 1 | 5 μS/cm | 10 μS/cm |
| Example 2 | 8 μS/cm | 12 μS/cm |
| Example 3 | 2 μS/cm | 2 μS/cm |
| Example 4 | 1 μS/cm | 1 μS/cm |
| Comp. Example 1 | Wetting at 2 days | Wetting at 3 hrs |
| Comp. Example 2 | Wetting at 10 days | Wetting at 3 days |

Example 5

The module for membrane distillation of Example 1 was used to construct a membrane distillation device in the same manner as Example 1, and simulated accessory water (a mixture of heavy oil and salts) was used as the raw water. The composition of the simulated liquid was as shown below.

TABLE 2

| Substance | Concentration | Note |
|---|---|---|
| Oil | 35 mg/L | As n-hexane extract |
| NaCl | 40,000 mg/L |  |
| COD-Cr | 1500 mg/l |  |

The other evaluation conditions were the same as in Example 1.
[Evaluation Conditions]
Raw water: Simulated accessory water
Circulating flow rate in membranes: 600 ml/min
Raw water temperature (module inlet end): 70° C. (conditions 1), 90° C. (conditions 2)
Cooling water temperature: 15° C.
Cooling water circulating flow rate: 1000 ml/min
Product water side vacuum degree: −90 kPaG
[Electric Conductivity of Product Water After 1000 Hours]
Table 3 shows the electric conductivity of product water after operation of each membrane distillation device for 1000 hours.
With a raw water temperature of 70° C. (conditions 1), the electric conductivity of the product water after 1000 hours was 4 μS/cm, and with a raw water temperature of 90° C. (conditions 2), the electric conductivity of the product water after 1000 hours was 8 μS/cm, both of which indicated satisfactory water quality and lack of wetting.

Comparative Example 3

The module for membrane distillation of Comparative Example 1 was used to construct a membrane distillation device in the same manner as Example 1, simulated accessory water (a mixture of heavy oil and salts) was used as the raw water in the same manner as Example 5, and evaluation was conducted in the same manner as Example 5.
[Electric Conductivity of Product Water After 1000 Hours]
Table 3 shows the electric conductivity of product water after operation of each membrane distillation device for 1000 hours.
As a result, the electric conductivity after 36 hours at a raw water temperature of 70° C. (conditions 1) exceeded 500 μS/cm, with wetting, and the electric conductivity after 4 hours at a raw water temperature of 90° C. (conditions 2) exceeded 500 μS/cm also with wetting.

TABLE 3

|  | Conditions 1 | Conditions 2 |
|---|---|---|
| Example 5 | 4 μS/cm | 8 μS/cm |
| Comp. Example 3 | Wetting at 36 hrs | Wetting at 4 hrs |

INDUSTRIAL APPLICABILITY

The module for membrane distillation according to one aspect of the present invention can inhibit wetting and provide product water with satisfactory water quality, thus contributing to stable operation and prolonged product life.

REFERENCE SIGNS LIST 10A, 10B Module for membrane distillation
11 Housing
12 Porous hollow fiber membrane
13 Adhesive resin
13A Rising section 14 Hydrophobic polymer
20 Cooling device
22 Condenser tube
30 Drain tank
100, 200, 300 Membrane distillation device
A Adhesively anchored location
NA Non-adhesively anchored location
C Connecting member
D Discharge port
I Raw water introduction unit

The invention claimed is:

1. A module for membrane distillation comprising a housing, and a plurality of porous hollow fiber membranes each having both ends adhesively anchored to the housing, wherein: the water contact angle of the outer surface of each of the porous hollow fiber membranes is 90° or greater, a hydrophobic polymer is adhered to at least some of the locations among the non-adhesively anchored locations of the porous hollow fiber membranes, and wherein the locations from one end to the other end in the lengthwise direction among the non-adhesively anchored locations are represented as 0% to 100% on both the inner surface and outer surface of each porous hollow fiber membrane, either or both the amount of hydrophobic polymer per membrane area adhering to locations at 0 to 5% from the one end and the amount of hydrophobic polymer per membrane area adhering to locations at 95 to 100% from the one end are greater than the amount of hydrophobic polymer per membrane area present in locations at 40 to 60% from the one end wherein a raw water introduction unit is disposed in so that the non-adhesively anchored location of each porous hollow fiber membrane is nearest to the raw water introduction unit at a location within less than 50% from the one end, and the amount of the hydrophobic polymer per membrane area of the porous hollow fiber membrane satisfies the following relationship: [Amount of hydrophobic polymer at locations at 0 to 20% from the one end]>[a mount of hydrophobic polymer at locations at 95 to 100% from the one end]>[a mount of hydrophobic polymer at locations at 40 to 60% from the one end.

2. A module for membrane distillation comprising a housing, and a plurality of porous hollow fiber membranes each having both ends adhesively anchored to the housing, wherein: a hydrophobic polymer is adhered to at least some of the locations among the non-adhesively anchored locations of the porous hollow fiber membranes, and wherein the locations from one end to the other end in the lengthwise direction among the non-adhesively anchored locations are represented as 0% to 100% on both the inner surface and outer surface of each porous hollow fiber membrane, both the amount of hydrophobic polymer per membrane area adhering to locations at 0 to 5% from the one end and the amount of hydrophobic polymer per membrane area adhering to locations at 95 to 100% from the one end are greater than the amount of hydrophobic polymer per membrane area present in locations at 40 to 60% from the one end wherein a raw water introduction unit is disposed so that the non-adhesively anchored location of each porous hollow fiber membrane is nearest to the raw water introduction unit at a location within less than 50% from the one end, and the amount of the hydrophobic polymer per membrane area of the porous hollow fiber membrane satisfies the following relationship: [Amount of hydrophobic polymer at locations at 0 to 20% from the one end]>[a mount of hydrophobic polymer at locations at 95 to 100% from the one end]>[a mount of hydrophobic polymer at locations at 40 to 60% from the one end].

3. The module for membrane distillation according to claim 1, wherein at locations at 0 to 20% from the one end, the amount of hydrophobic polymer per membrane area on the raw water entering surface of the porous hollow fiber membrane is greater than the amount of hydrophobic polymer per membrane area on the vapor exiting surface of the porous hollow fiber membrane.

4. A membrane distillation device for water production, comprising a module for membrane distillation according to claim 1.

5. The membrane distillation device according to claim 4, wherein: the membrane distillation device further comprises a cooling device connected with the module for membrane distillation, the module for membrane distillation is constructed so that each of the porous hollow fiber membranes is anchored in the vertical direction with the one end directed downward, and raw water is introduced into the porous hollow fiber membranes from the one end, and the lower end of the connecting member between the module for membrane distillation and the cooling device is at a position higher than ½ of the total height of the non-adhesively anchored locations of the porous hollow fiber membranes.

6. The membrane distillation device according to claim 4, wherein: the module for membrane distillation is constructed so that each of the porous hollow fiber membranes is anchored in the vertical direction with the one end directed downward, and raw water is introduced into the porous hollow fiber membranes from the one end, and the module for membrane distillation has a discharge port at a position in the vertical direction corresponding to a position lower than ½ of the total height of the non-adhesively anchored locations of the porous hollow fiber membranes.

7. The module for membrane distillation according to claim 2, wherein at locations at 0 to 20% from the one end, the amount of hydrophobic polymer per membrane area on the raw water entering surface of the porous hollow fiber membrane is greater than the amount of hydrophobic polymer per membrane area on the vapor exiting surface of the porous hollow fiber membrane.

8. The module for membrane distillation according to claim 1, wherein at locations at 0 to 20% from the one end, the amount of hydrophobic polymer per membrane area on the raw water entering surface of the porous hollow fiber membrane is greater than the amount of hydrophobic polymer per membrane area on the vapor exiting surface of the porous hollow fiber membrane.

9. A membrane distillation device for water production, comprising a module for membrane distillation according to claim 2.

10. A membrane distillation device for water production, comprising a module for membrane distillation according to claim 1.

11. A membrane distillation device for water production, comprising a module for membrane distillation according to claim 3.

12. The membrane distillation device according to claim 5, wherein: the module for membrane distillation is constructed so that each of the porous hollow fiber membranes is anchored in the vertical direction with the one end directed downward, and raw water is introduced into the porous hollow fiber membranes from the one end, and the module for membrane distillation has a discharge port at a position in the vertical direction corresponding to a position lower than ½ of the total height of the non-adhesively anchored locations of the porous hollow fiber membranes.

* * * * *